United States Patent
Nakarmi et al.

(10) Patent No.: US 12,149,927 B2
(45) Date of Patent: Nov. 19, 2024

(54) PRIVACY CONTROL OF USER EQUIPMENT AND RELATED APPARATUSES

(71) Applicant: Telefonaktiebolaget LM Ericsson (publ), Stockholm (SE)

(72) Inventors: Prajwol Kumar Nakarmi, Sollentuna (SE); Åke Busin, Sollentuna (SE); David Castellanos Zamora, Madrid (ES); Christine Jost, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 562 days.

(21) Appl. No.: 17/434,326

(22) PCT Filed: Mar. 3, 2020

(86) PCT No.: PCT/EP2020/055527
§ 371 (c)(1),
(2) Date: Aug. 26, 2021

(87) PCT Pub. No.: WO2020/178277
PCT Pub. Date: Sep. 10, 2020

(65) Prior Publication Data
US 2022/0167153 A1 May 26, 2022

Related U.S. Application Data

(60) Provisional application No. 62/813,302, filed on Mar. 4, 2019.

(51) Int. Cl.
*H04W 12/06* (2021.01)
*H04W 12/02* (2009.01)
(Continued)

(52) U.S. Cl.
CPC ........... *H04W 12/02* (2013.01); *H04W 12/06* (2013.01); *H04W 12/088* (2021.01);
(Continued)

(58) Field of Classification Search
None
See application file for complete search history.

(56) References Cited

U.S. PATENT DOCUMENTS

2003/0153310 A1* 8/2003 Ishii ...................... H04W 12/08
455/435.1
2004/0033803 A1* 2/2004 Varonen .................. H04W 4/02
455/445

(Continued)

FOREIGN PATENT DOCUMENTS

| CN | 101194526 A | 6/2008 |
| JP | 2015-512227 A | 4/2015 |
| WO | 2013134373 A1 | 9/2013 |

OTHER PUBLICATIONS

3GPP TSG-SA WG2 Meeting #44, Budapest, Hungary, Jan. 26-Feb. 2, 2005. (Year: 2005).*

(Continued)

*Primary Examiner* — Joseph P Hirl
*Assistant Examiner* — Hassan Saadoun
(74) *Attorney, Agent, or Firm* — Sage Patent Group

(57) ABSTRACT

A method performed by a mobile terminal for verifying at least one privacy profile setting for positioning of the mobile terminal to a location network node in a communications network is provided. The method includes receiving a request from the location network node for the mobile terminal to provide a position of the mobile terminal. The method further includes checking the at least one privacy profile setting of the mobile terminal for permission to provide position information of the mobile terminal. The method further includes determining whether to send the positioning information of the mobile terminal to the location network node based on the checking the at least one privacy profile setting. Methods performed by a network node are also provided.

15 Claims, 29 Drawing Sheets

(51) Int. Cl.
*H04W 12/088* (2021.01)
*H04W 12/30* (2021.01)
*H04W 64/00* (2009.01)
*H04W 12/63* (2021.01)

(52) U.S. Cl.
CPC .......... *H04W 12/30* (2021.01); *H04W 64/00* (2013.01); *H04W 12/63* (2021.01)

(56) References Cited

U.S. PATENT DOCUMENTS

| | | | | |
|---|---|---|---|---|
| 2004/0043774 | A1* | 3/2004 | Lee | H04W 64/00 455/433 |
| 2006/0246920 | A1* | 11/2006 | Shim | H04L 67/306 455/456.2 |
| 2013/0109344 | A1* | 5/2013 | Ung | H04W 4/90 455/404.2 |
| 2014/0066018 | A1* | 3/2014 | Zhu | H04W 12/02 455/411 |
| 2020/0252462 | A1* | 8/2020 | Blair | H04W 4/02 |

OTHER PUBLICATIONS

Notice of Reasons for Rejection for Japanese Patent Application No. 2021-551518, including English translation, dated Nov. 1, 2022.
Qualcomm Incorporated, "Addition of Deferred 5GC-MT-LR Procedure for Periodic, Triggered and UE Available Location Events for TS 23.273," S2-1902292, 3GPP TSG SA WG2 Meeting #131, Feb. 25-Mar. 1, 2019, Santa Cruz, Tenerife, Spain, 9 pages.
Qualcomm Incorporated, "Correction and Completion of commercial5GC-MT-LR procedure for TS 23.273," S2-1902342, 3GPP TSG SA WG2 Meeting #131, Feb. 25-Mar. 1, 2019, Santa Cruz, Tenerife, Spain, 6 pages.
International Search Report and Written Opinion of the International Searching Authority for PCT International Application No. PCT/EP2020/055527 dated Jul. 6, 2020.
Orange et al., "Codeword Generation and Distribution," Tdoc S2-050295, 3GPP TSG-SA WG2 Meeting #44, Budapest, Hungary, Jan. 26-Feb. 2, 2005, 2 pages.
Proposed changes in Chapter 7 in version 1.0.0 of TR "Enhanced user privacy for location services," First changed section, Tdoc S1-020160, 3GPP TSG-SA WG1 LCS ad hoc meeting, Phoenix, USA, Jan. 16, 2002, 3 pages.
Nokia et al., "Positioning Access Type Selection," S2-1902294, 3GPP TSG-SA WG2 Meeting #131, Feb. 25-Mar. 1, 2019, Tenerife, Spain, 2 pages.
3GPP TS 23.271 V6.13.0, "3rd Generation Partnership Project; Technical Specification Group Services and System Aspects; Functional stage 2 description of Location Services (LCS) (Release 6)," Technical Specification, Sep. 2005, 121 pages.
Office Action for Chinese Patent Application No. 202080019501.8 dated Jan. 25, 2024, 7 pages.
Ericsson, "Requirement to register Public Id before usage," Tdoc S2-020160, 3GPP TSG-SA WG2 Meeting #22, Phoenix, USA, Jan. 14-18, 2002, 3 pages.

* cited by examiner

PRIVACY CONTROL OF USER EQUIPMENT AND RELATED APPARATUSES

CROSS REFERENCE TO RELATED APPLICATIONS

This application is a 35 U.S.C. § 371 national stage application of PCT International Application No. PCT/EP2020/055527 filed on Mar. 3, 2020, which claims the benefit of U.S. Provisional Patent Application Ser. No. 62/813,302, filed on Mar. 4, 2019, the disclosures and content of which are incorporated by reference herein in their entireties.

TECHNICAL FIELD

The present disclosure relates generally to wireless communications systems and, more particularly, to privacy control of user equipment that is in communication with a wireless network.

BACKGROUND

3GPP is the de-facto organization that develops technical specifications (TS) for mobile networks. The technical specifications for generations of mobile networks, namely 2G (GSM/GPRS), 3G (UMTS), 4G (LTE), and 5G, were developed by 3GPP. On a very high level, a 3GPP system includes user equipment 106 (UE, which is also referred to herein as a mobile terminal), and a network 100 that includes a radio access network (RAN) 102, and a core network (CN) 104, shown in FIG. 1. The UE 106 is a mobile device used by a user to wirelessly access the network 100. The RAN 102 includes base stations which provide wireless radio communication to the UE 106 and connecting the UE 106 to the core network 104. The CN 104 includes several types of core network functions which are responsible for various functions such as handling the mobility of the UE 106, interconnecting to data network, packet routing and forwarding, among other responsibilities.

A 3GPP system supports location services (LCS) and provides mechanisms to position UEs in outdoor and indoor environments. Information about a UEs' position may be used by a 3GPP system for internal purposes, by emergency services or value-added services, by the UE itself, or by third party services.

An LCS architecture in 5G is illustrated in FIG. 3. Referring to FIG. 3, AF 315 is an Application Function network node. NEF 309 is a Network Exposure Function network node. UDM 313 is a Unified Data Management function network node. GMLC is a Gateway Mobile Location Centre function. HGMLC 319 is a Home GMLC function network node. VGMLC 307 is a Visited GMLC function. LMF 305 is a Location Management Function network node. LRF 307 is a Location Retrieval Function which may be co-located with VGMLC 307, or may be located at a separate or different network node of visited network 100a. AMF 303 is an Access and Mobility Management Function network node.

SUMMARY

According to some embodiments of inventive concepts, methods performed by a mobile terminal for verifying a privacy profile setting for positioning of the mobile terminal to a location network node in a communications network are provided. In such methods, a processor of the mobile terminal receives a request from the location network node for the mobile terminal to provide a position of the mobile terminal. The mobile terminal checks the privacy profile setting for permission to provide position information of the mobile terminal. The mobile terminal determines whether to send the positioning information based on checking the privacy profile setting.

According to some embodiments of inventive concepts, methods performed by a mobile terminal for secure verification of requests to position the mobile terminal in a communications network are provided. In such methods, a processor of the mobile terminal receives a security token of a home network, and generates an authentication decision for the mobile terminal by validating the security token of the home network. The mobile terminal communicates positioning information of the mobile terminal to a network node of a visited network of the mobile terminal when the authentication decision validates the security token.

According to other embodiments of inventive concepts, methods performed by a network node of a home network for secure verification of requests to position a mobile terminal in a communications network are provided. In such methods, a processor of the network node sends a security token of the home network to a network node of a visited network of the mobile terminal. The network node of the home network receives positioning information of the mobile terminal when the mobile terminal validates the security token.

According to some embodiments of inventive concepts, methods performed by a mobile terminal for securely updating privacy profile settings of the mobile terminal to a network node for subsequent requests to position the mobile terminal in a communications network are provided. In such methods, a processor of the mobile terminal sends a message to a network node to update the privacy profile settings of the mobile terminal for subsequent requests to position the mobile terminal. Responsive to sending the message, the mobile terminal receives a security token (e.g., a message authentication code, MAC) from the network for updating the privacy profile settings of the mobile terminal. The mobile terminal verifies the MAC with a key that is shared between the mobile terminal and the communications network; calculates a confirmation MAC using the shared key; and completes the update when the mobile terminal receives verification of the MAC.

According to other embodiments of inventive concepts, methods performed by a first network node for securely updating privacy profile settings of a mobile terminal in a communications network for subsequent requests to position the mobile terminal in the communications network are provided. In such methods, a processor of the first network node receives a message to update the privacy profile settings of the mobile terminal for subsequent requests to position the mobile terminal. The first network node sends a message to a second network node requesting a security token (e.g., a MAC) for updating the privacy profile settings of the mobile terminal. Responsive to sending the message, the first network node receives the MAC from the second network node for updating the privacy profile settings of the mobile terminal; forwards the MAC towards the mobile terminal for verification of the MAC; and completes the update when the first network node verifies the MAC.

According to some embodiment of inventive concepts, methods performed by a mobile terminal for securely updating privacy profile settings of the mobile terminal to a network node for subsequent requests to position the mobile terminal in a communications network are provided.

According to some embodiments of inventive concepts, methods performed by a network node for securely updating privacy profile settings of the mobile terminal for subsequent requests to position the mobile terminal in a communications network are provided.

According to some embodiments of inventive concepts, mobile terminals and network nodes have privacy control for verifying privacy profile setting(s) before a mobile terminal sends positioning information to a network node and for securely updating privacy profile settings of a mobile network for subsequent requests to position the mobile terminal.

Corresponding embodiments of inventive concepts for a mobile terminal, network node, and first network node, computer products, and computer programs are also provided.

Privacy is an aspect to consider while positioning a UE because positioning may also position the user or owner of the UE.

One approach to address the privacy of a UE's user or owner may provide confidentiality and integrity protection of messages so that it may not be feasible for unauthorized parties to identify or trace users based on messages transmitted over the air. Another approach may provide consent processing to ensure that the network checks whether or not a UE's user or owner has provided his/her consent to the positioning services before his/her UE can be positioned. Another approach may include a UE which may send privacy profile settings to the network, which may contain information such as whether the LCS requests are allowed or disallowed by the UE, a time for disallowing the LCS requests, and which LCS client types are allowed (e.g., NG-RAN, third party AF, etc.).

While these approaches may address privacy of the UE's user or owner, these approaches do not address effectiveness of consent processing and privacy settings of the UE's user. For example, as illustrated in FIG. 3 (described further below), there are many network functions involved in using the LCS, with each of them neither necessarily owned by a same entity, nor necessarily within the same security domain. In other words, security properties and trust relations between the network functions vary.

Various embodiments of the present disclosure may provide solutions to these and other potential problems. In various embodiments of the present disclosure, mobile terminals and network nodes operate with privacy control for verifying privacy profile setting(s) before a mobile terminal sends positioning information to a network node and for securely updating privacy profile settings of a mobile network for subsequent requests to position the mobile terminal. As a consequence, effective consent processing and privacy settings of a mobile terminal's user may be provided.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
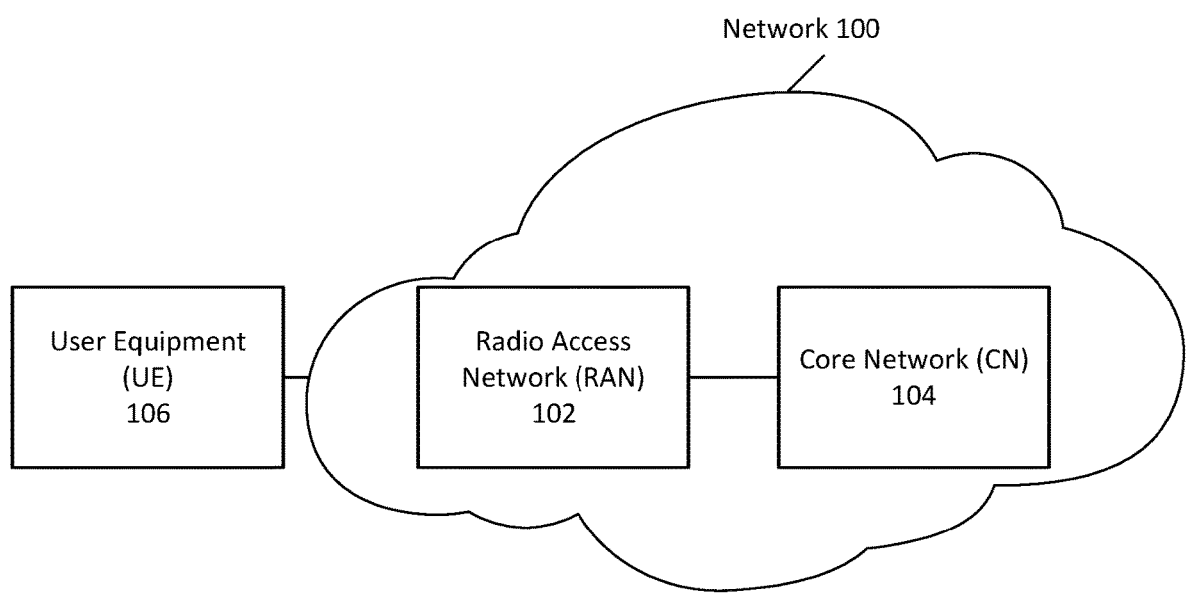
FIG. 1 illustrates a simplified 3GPP system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "terminal" is used in a non-limiting manner and, as explained below, can refer to any type of radio communication terminal. The term "terminal" herein may be interchangeable replaced with the term "radio terminal," "radio communication terminal," "radio device," or "user equipment (UE)."

Positioning methods may use 3GPP positioning methods or a combination of 3GPP and non-3GPP positioning methods. Examples of 3GPP positioning methods that may be used include observed time difference of arrival (OTDOA) positioning and an enhanced cell identifier method. Examples of non-3GPP positioning methods that may be used include positioning based on WLAN, Bluetooth, Global Navigation Satellite System (GNSS), Terrestrial Beacon Systems (TBS), and sensors e.g. a barometer.

Approaches to positioning modes may include:
A standalone mode, in which a UE may perform measurements and calculate its own location estimate without assistance from the network.
A UE-Based mode, in which a UE may perform measurements and calculate its own location estimate with assistance from the network.
A UE-Assisted mode, in which a UE may perform measurements with or without assistance from the network and send measurements to the network where the calculation of location estimation takes place.

Types of location requests (also referred to herein as positioning requests) may include:
Network Induced Location Request (NI-LR): With a Network Induced Location Request (NI-LR), a serving AMF for a UE may initiate location of the UE for some regulatory service (e.g. an emergency call from the UE).
Mobile Terminated Location Request (MT-LR): With a Mobile Terminated Location Request (MT-LR), an LCS client external to or internal to a serving PLMN may send a location request to the PLMN (which may be the HPLMN or VPLMN) for the location of a target UE
Mobile Originated Location Request (MO-LR): With a Mobile Originated Location Request (MO-LR), a UE may send a request to a serving PLMN for location related information for the UE. It may be of type immediate or deferred.

Figure 2:
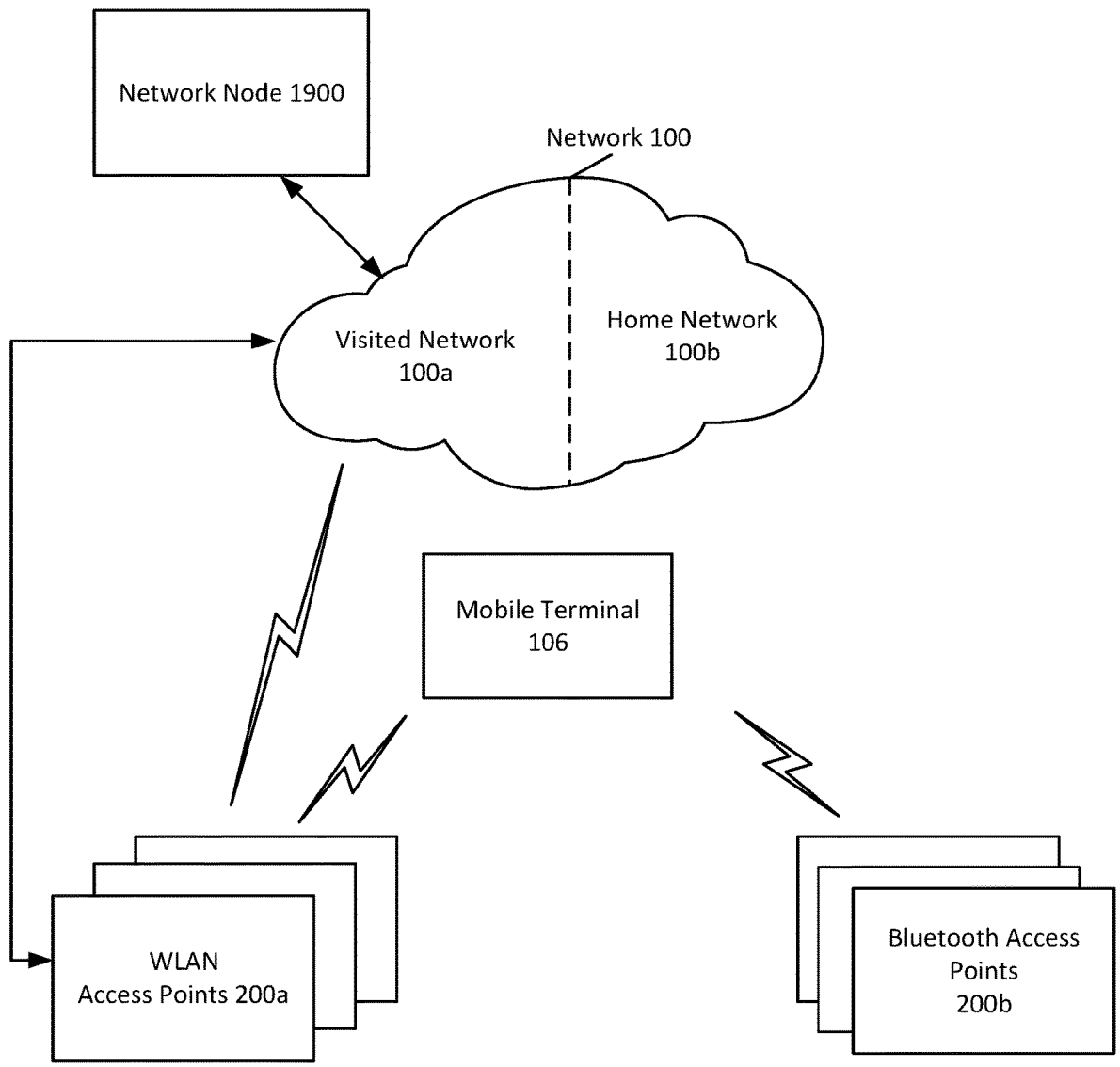
FIG. 2 is a block diagram of a communications network in accordance with some embodiments of the present disclosure.
Figure 3:
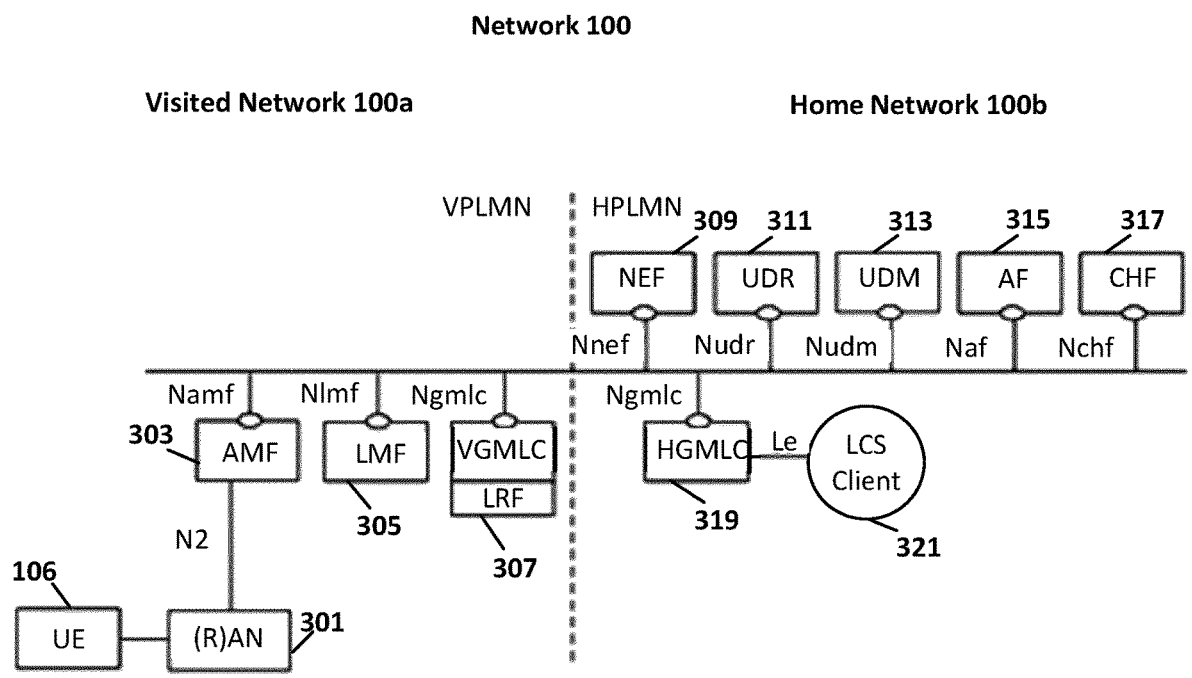
FIG. 3 illustrates an LCS architecture in 5G (roaming scenario)

FIG. 2 is a block diagram of a communications network in accordance with some embodiments of the present disclosure.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 100 (including visited network 100*a* and home network 100*b*), WLAN access points 200*a*, Bluetooth access points 200*b*, network node 1900, and mobile terminal 106. In practice, a wireless network may further include any additional elements suitable to support communication between wireless devices or between a wireless device and another communication device, such as any other network node or end device.

Network node 1900 may be, but is not limited to, access points (APs) (e.g., radio access points), base stations (BSs) (e.g., radio base stations, Node Bs, evolved Node Bs (eNBs), NR NodeBs (gNBs), Access and Mobility Management function (AMF) network node, Location Management function (LMF) network nodes, Visited CMCL (VCMLC) network node, Network Exposure function (NEF) network node, Unified Data Repository function (UDR) network node, Unified Data Management function (UDM) network node, Application function (AF) network node, Home GMLC (HGMLC) network nodes, client nodes, etc.).

With reference to FIG. 2, the mobile terminal 106 verifies privacy profile setting(s) before sending positioning information of mobile terminal 106 to a network node 1900 and securely updates privacy profile settings of mobile network 106 for subsequent requests to position mobile terminal.

These and other related operations now be described in the context of FIGS. 4-9 and the operational flowcharts of FIGS. 10-17 that are performed by a mobile terminal 106 or a network node 1900.

An approach for privacy control may be as follows. A UDM may provide UE privacy profile setting(s) to AMF, NEF and GMLC, if this information is available. UE privacy profile setting may not be sent to a V-GMLC. The GMLC may get the UE privacy profile settings from a UDM. A H-GMLC may check UE privacy profile settings prior to delivering a location estimate. The H-GMLC may check UE privacy settings to verify if LCS client is authorized for 5GC_MT_LR. An AMF may get the UE privacy settings from the UDM. The AMF may use UE privacy profile setting(s) in case of 5GC-MO-LR to verify if NF service consumer is authorized. The NEF My get the UE privacy profile setting(s) from the UDM. The NEF may use the UE privacy profile setting(s) to verify if the AF is authorized for 5GC_MT_LR. If the privacy profile setting(s) provided by the UE and the AF conflict, the one provided by UE may take precedence. An authorized AF may provision the UE privacy profile setting(s) for specific UE(s) via the NEF. If the privacy profile setting(s) provided by the UE and the AF conflict, the NEF may give precedence to the one provided by UE.

Figure 4:
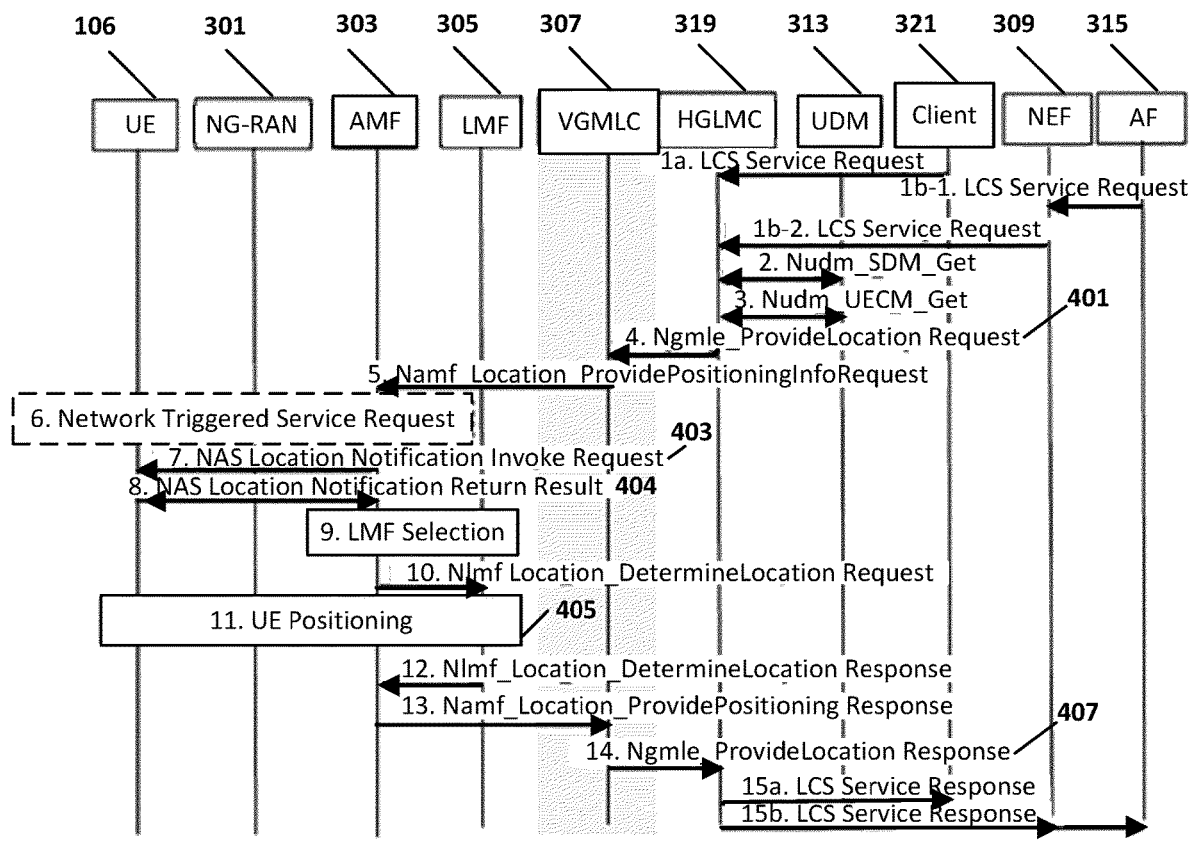
FIG. 4 illustrates an example procedure in LCS.

FIG. 4 illustrates an example of procedures and messages involved in LCS, as described in 3GPP TS 23.273 (V.0.1.0), among mobile terminal 106, NG-Radio Access Network (NG-RAN) network node 301, AMF network node 303, LMF network node 305, V-GMLC network node 307, H-GMLC network node 319, UDM network node 313, external client network node 321, NEF network node 309, and AF network node 315.

Referring to FIG. 4, at 403, if an indicator of privacy check related action indicates that the UE either be notified or notified with privacy verification, a notification invoke message may be sent to the target UE 106, indicating the identity of the LCS client the Requestor Identity (if that is both supported and available) and whether privacy verification is required. At 404, the target UE may notify the UE 106 user of the location request and, if privacy verification was requested, waits for the user to grant or withhold permission. UE 106 then returns a notification result to AMF 303 indicating, if privacy verification was requested, whether permission is granted or denied for the current LCS request. The notification result also may indicate the UE 106 privacy profile setting(s) for the subsequent LCS requests, if generated. The privacy profile setting(s) for the subsequent LCS requests may indicate whether the subsequent LCS request(s) is allowed or disallowed by UE 106. The UE 106's privacy profile setting(s) may also indicate a time for disallowing the subsequent LCS requests.

At 403 and 404 of FIG. 4, a mis-behaving AMF may skip those operations and proceed without checking the privacy profile control, and then the privacy profile control operations at 403 and 404 are not performed.

Presently disclosed embodiments may operate to allow mobile terminals and network nodes to have privacy control for verifying privacy profile setting(s) before a mobile terminal sends positioning information to a network node and for securely updating privacy profile settings of a mobile network for subsequent requests to position the mobile terminal.

In some embodiments, for resilient privacy profile control operations, for example even in the presence of a mis-behaving AMF 303, when UE 106 transfers measurements to the network, the UE may verify the privacy profile settings before transferring those measurements to the network. Referring to FIG. 4, the UE may perform the check during operation 405.

The check may include whether the positioning is allowed or disallowed by UE 106 (at that time), whether the user of UE 106 needs to be informed and asked for permission, whether other conditions are met, e.g., what type of positioning is being performed, etc. If the privacy profile settings check at 404 succeeds, UE 106 may continue as normal and participate in UE positioning, send measurements to network, etc.

If the privacy profile setting check at 405 fails, UE 106 may not send measurements to the network. UE 106 may initiate a privacy profile setting update procedure. Alternatively (or in addition), UE 106 may record the failure of the check; may inform the user of UE 106, e.g. a pop up display, or a sound notification, or an email or SMS; may send a message to VPLMN about the failure of the check; may send a message to HPLMN about the failure of the check; may send limited measurements to the network, instead of full measurements; and/or may ignore the failure of the check, e.g., permanently or temporarily.

Figure 10:
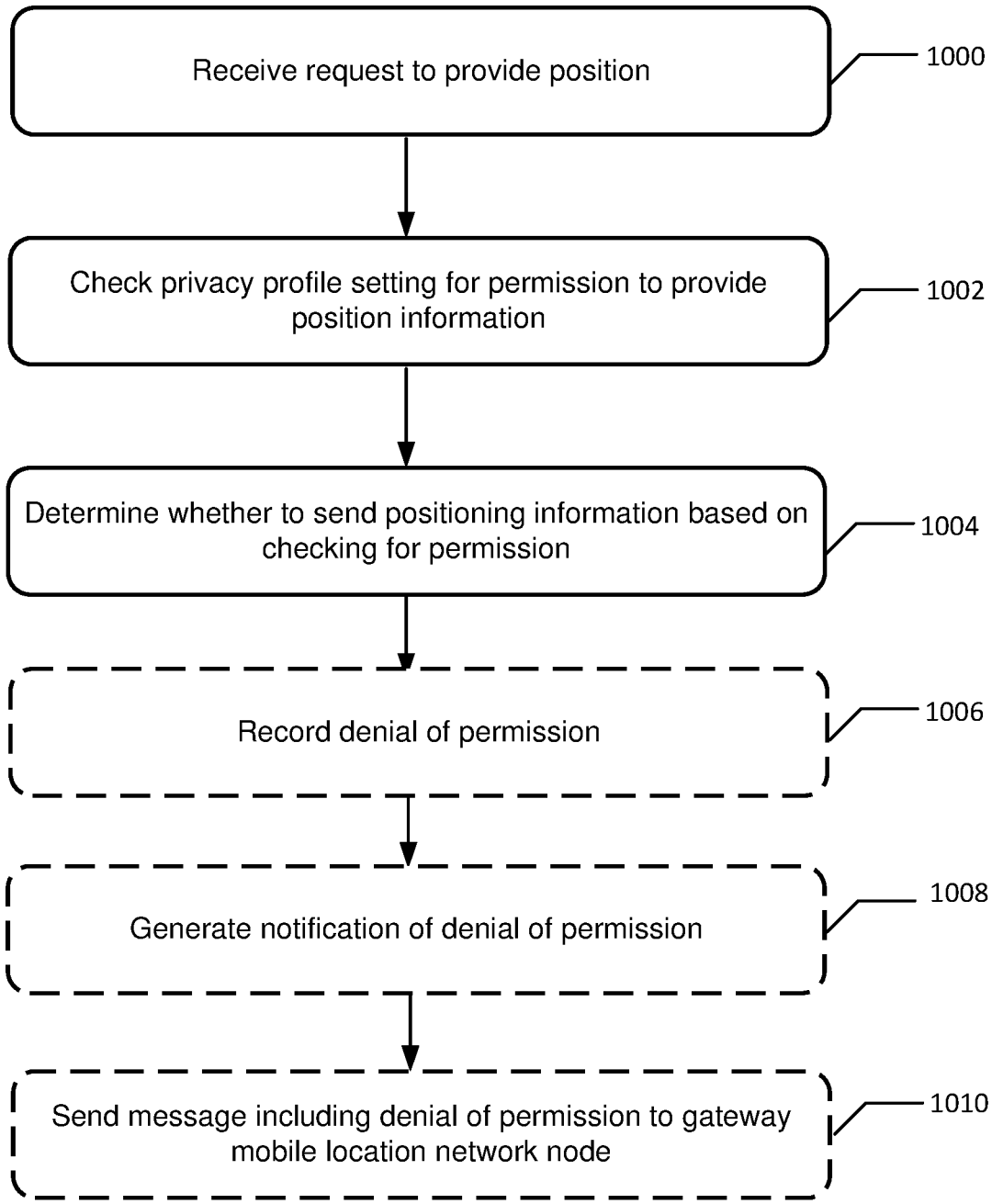
FIGS. 10 and 11 are flowcharts of operations that may be performed by a mobile terminal, in accordance with some embodiments of the present disclosure.
Figure 11:
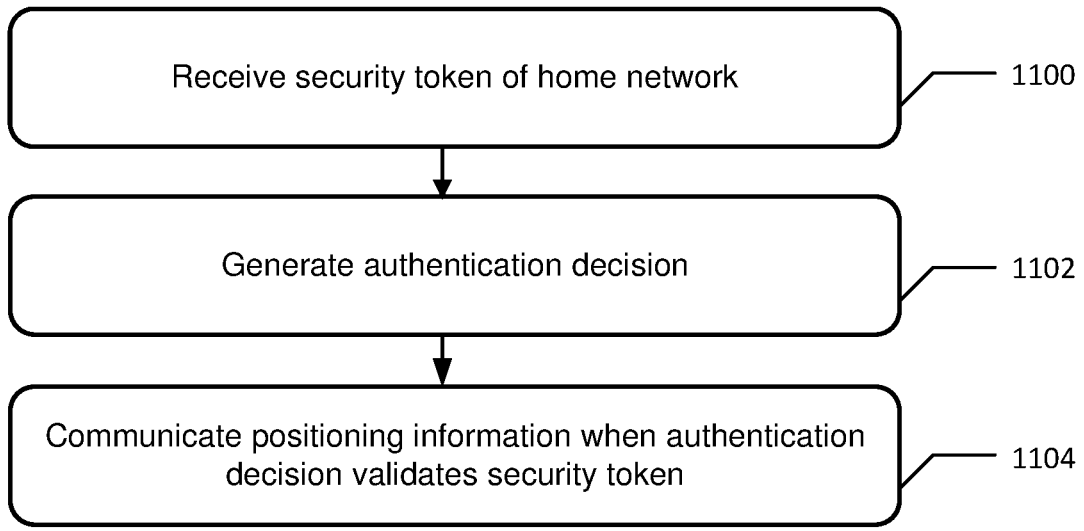

Operations of mobile terminal 106 (implemented using the structure of the block diagram of FIG. 18) will now be addressed with reference to the flow charts of FIGS. 10 and 11 according to some embodiments of inventive concepts. For example, modules may be stored in memory 1820 of FIG. 18, and these modules may provide instructions so that when the instructions of a module are executed by processor 1810, processor 1810 performs respective operations of the flow chart.

Referring to FIG. 10, at 1000, mobile terminal 106 receives a request from a location network node 305 for the mobile terminal to provide a position of the mobile terminal 106.

At 1002, mobile terminal 106 checks the privacy profile setting(s) of mobile terminal 106 for permission to provide position information of the mobile terminal. The operation of checking grants permission for mobile terminal 106 to provide the positioning information. Permission may be determined based on whether mobile terminal 106 is allowed or disallowed at the time of the request to provide the positioning information of mobile terminal 106. Permission also may be determined based on generating a notification to a user of mobile terminal 106 for the user to respond to indicate whether mobile terminal 106 is allowed or disallowed to provide the positioning information of mobile terminal 106, and receiving a response to the notification from the user indicating whether mobile terminal 106 is allowed or disallowed to provide the positioning information of mobile terminal 106. Permission may further be determined based on whether at least one condition is met including, e.g., allowing or disallowing providing the position information of mobile terminal 106 using a specified positioning measurement. The specified positioning method may include measuring signals received from a at least one of a WiFi access point 200a and a Bluetooth access point 200b.

At 1004, mobile terminal 106 determines whether to send the positioning information of mobile terminal 106 to location network node 305 based on the checking of the privacy profile setting(s). The operation of determining may include sending the positioning information of mobile terminal 106 to the location network node 305.

When the operations of 1002 deny permission to provide the positioning information and the operations of 1004 determine not to send the positioning information to location network node 305, additional operations may be performed. At 1006, mobile terminal 106 may record the denial of permission by, e.g., updating the privacy profile setting(s) with the denial of permission and/or recording the denial of permission in 1820 memory of mobile terminal 106. Alternatively, mobile terminal 106 may generate a notification to the user of the denial of permission; send a message to a gateway mobile location network node comprising the denial of permission; send limited positioning information to location network node 305; and/or ignore the denial of permission and send the positioning information of mobile terminal 106 to location network node 305.

The positioning information of mobile terminal may include, but is not limited to, location measurements and a location estimate.

Various operations from the flow chart of FIG. 10 may be optional with respect to some embodiments of mobile terminals and related methods. For example, operations of blocks 1006, 1008, and 1010 of FIG. 10 may be optional.

Referring to FIG. 11, at 1100, mobile terminal 106 receives a security token of a home network. The security token may be received directly from a network node of the home network or may be received indirectly from a network node of the home network via a network node or the visited network.

At 1102, mobile terminal 106 generates an authentication decision. The authentication decision may include validating the security token of the home network.

At 1104, mobile terminal 106 communicates positioning information of mobile terminal 106 to a network node 305 of the visited network when the authentication decision validates the security token.

The security token may be, but is not limited to, a message authentication code (MAC); a digital signature; and a defined value. The defined value may include, but is not limited to, a one-time use nonce. The nonce may be pre-shared with the mobile terminal operation by including the nonce in a message sent to mobile terminal 106.

In other embodiments, for resilient privacy profile control operations, for example even in the presence of a misbehaving PLMN or VPLMN, the home PLMN or HPLMN and the UE (or other trusted entities or functions and the UE) may have secure way of verifying any positioning attempts.

Referring to FIG. 4, the operation at 401 may contain a security token from an entity such as H-GMLC 319, UDM 313, AUSF (not shown in diagram), NEF 309, AF 315, or external client 321. The security token may be transferred to the UE 106, for example, in operation 403 or operation 405. UE 106 may check whether the security token is valid or not. UE 106 may send measurement reports to the network if the security token is present and valid.

The security token may be, for example, a message authentication code (MAC), digital signatures, or any pre-agreed value.

The MAC may be generated/verified, for example, by using a key (e.g., Kausf) that may be currently established between the home network 100b and UE 106 during primary authentication. Use of such a MAC in other contexts are described, for example, in Clause 6.14 (steering of roaming security mechanism) and 6.15 (UE parameters update via UDM control plane procedure security mechanism) in 3GPP TS 33.501.

The digital signatures may be generated/verified, for example by, using public/private key similar to the one used for permanent identifier concealment, see e.g. Clause 5.2.5, 5.8.2, 6.12, Annex C in 3GPP 33.501, with a difference that instead of encryption (e.g., ECIES—elliptic curve integrated encryption scheme), a signature may be calculated (e.g., ECDSA—elliptic curve digital signature algorithm).

The input to MAC and digital signatures may or may not include the message itself and freshness parameters like counters.

The pre-agreed value may be a nonce that will be used once and pre-shared, for example, using any radio resource control (RRC) message, non-access stratum (NAS) message, LTE positioning protocol (LPP) message, short message service (SMS) message, hypertext transfer protocol (HTTP) message, or any other messages.

The home PLMN (or other trusted entities or functions) may also provide the security token to the VPLMN in advance, for example in batch, e.g., a list of pre-agreed values. Doing so may increase efficiency because the VPLMN may not have a security token ready to be used in future. The HPLMN may still have control because it can choose how many tokens to give to the VPLMN.

Figure 5:
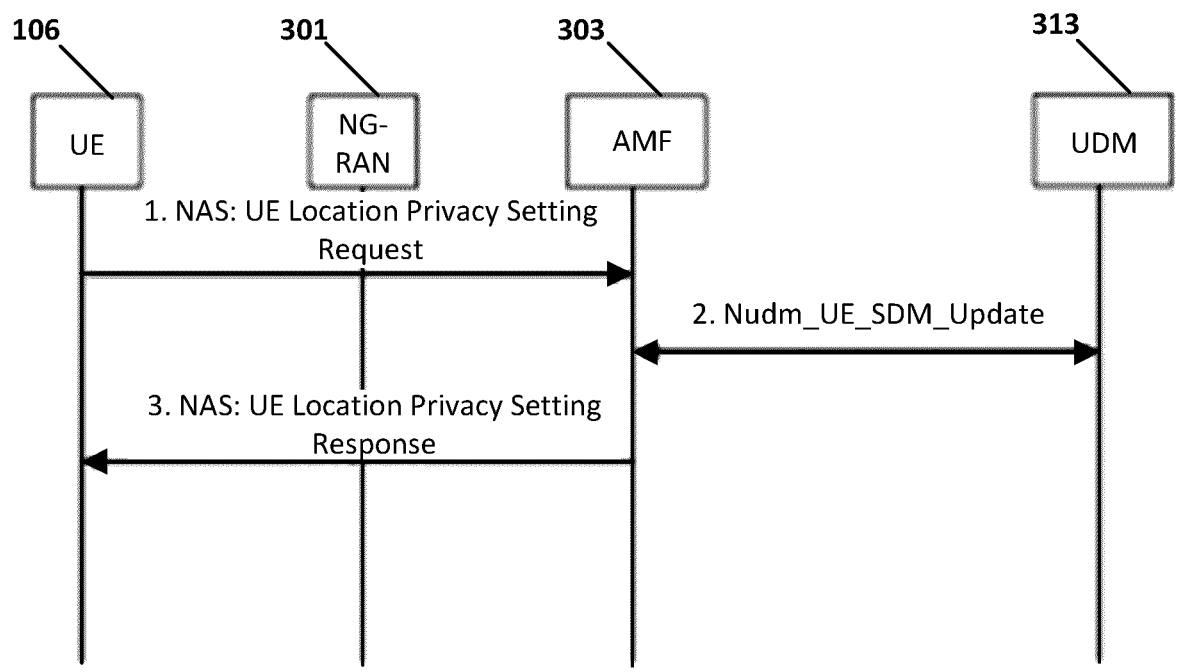
FIG. 5 illustrates an example of standalone privacy profile settings update by a UE in LCS.

FIG. 5 illustrates an example of an approach for a standalone privacy profile settings update by a UE in LCS. The UE may send updated privacy profile settings to UDM 313 during an ongoing procedure like 5GC-MO-LR, 5GC-MT-LR and Deferred 5GC-MT-LR Procedure for Periodic, Triggered and UE Available Location Events. The updated value may be stored into the UDR by UDM 313 after the interaction with AMF 303. In relation to FIG. 4, UE 106 may use operation 404 to indicate the UE 106's privacy setting for the subsequent LCS requests.

UE 106 may send updated privacy settings to UDM 313 at standalone procedure as shown in FIG. 5 using a separate NAS message.

Referring to FIG. 5, UE privacy profile setting(s) may be protected between UE 106 and AMF 303 by NAS security. UE 106's privacy profile setting(s) between AMF 303 to UDM 313 may be protected using service-based architecture (SBA) or service-based interface (SBI) security.

One approach for protecting a UE's privacy profile setting(s) end to end between a UE and an UDM may be as following, e.g.:
1. A key called Kausf (shared between UE and AUSF) may be used;
2. UE may calculate security token called MAC over the privacy profile setting update;
3. UDM may verify the MAC with the help of AUSF;
4. UDM may send confirmation MAC to UE, with the help of AUSF; and/or
5. UE may verify the confirmation MAC.

The above described approach uses a Steering of Roaming (SoR) type solution in the opposite direction (see e.g., Clause 6.14 Steering of Roaming security mechanism in 3GPP TS 33.501) and therefore may be inelegant.

In some embodiments, UE 106 may send updated privacy profile settings to the UDM using more elegant mechanisms to secure UE 106 a privacy profile setting update against tampering between UE and UDM. For example, FIG. 6 is a message sequence where the network is the initiator of a verification message for updating privacy profile settings, in accordance with some embodiments of the present disclosure.

Figure 6:
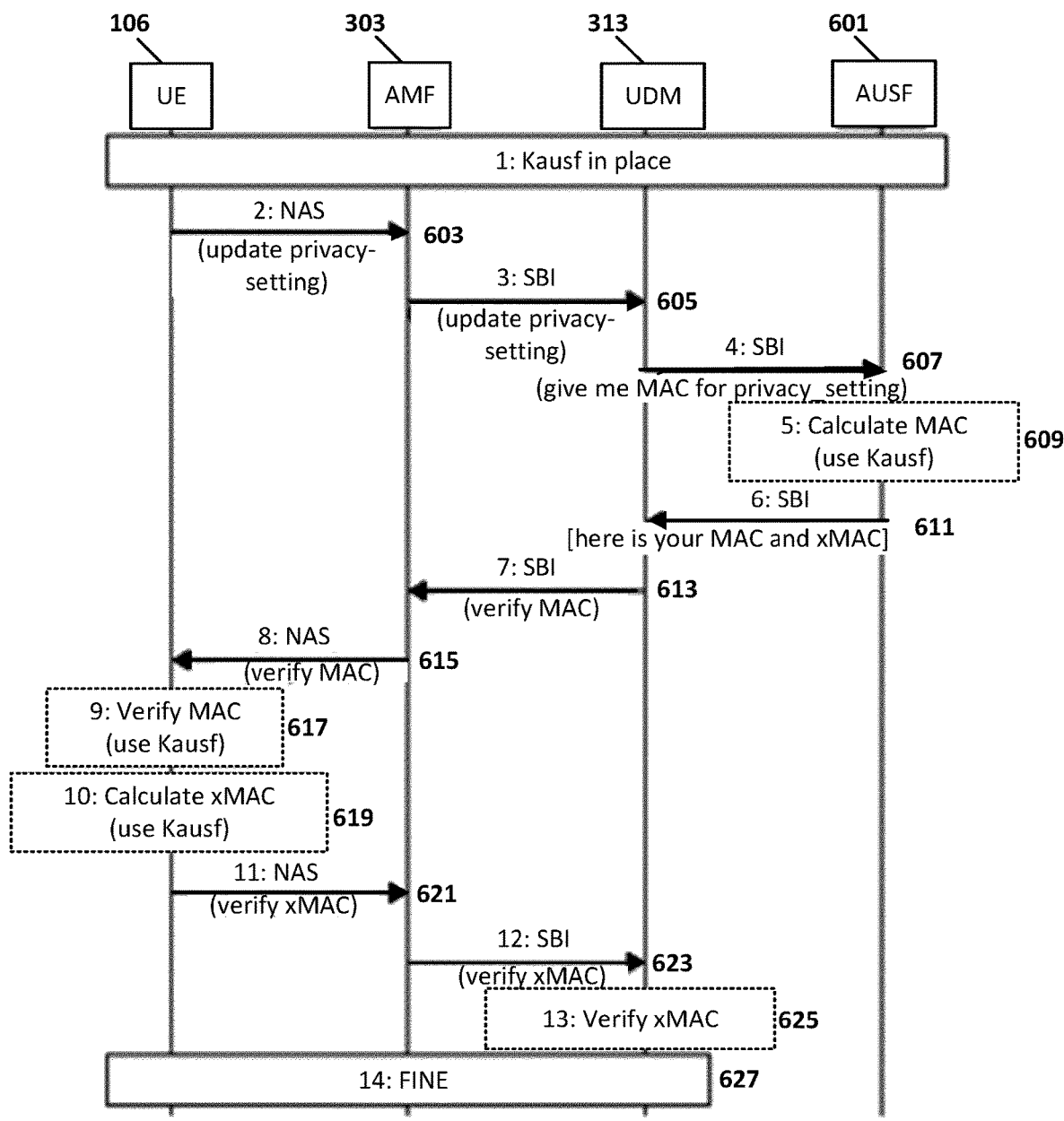
FIG. 6 is a message sequence for updating privacy profile settings, in accordance with some embodiments of the present disclosure.

Variants with regard to the operations of FIG. 6 may include:
UDM 313 replaying privacy profile setting to UE 106 along with MAC for verification.
UDM 313 sending HASH of privacy profile setting to AUSF 601; and UDM 313 sending HASH and MAC to UE 106 for verification.
Final confirmation MAC (xMAC) from UE 106 to UDM 313 may be optional.
If UE 106 does not receive MAC from AMF 303 or, MAC verification fails at UE 106, UE 106 may try updating privacy profile setting(s) again until successful verification of received MAC.

Figure 12:
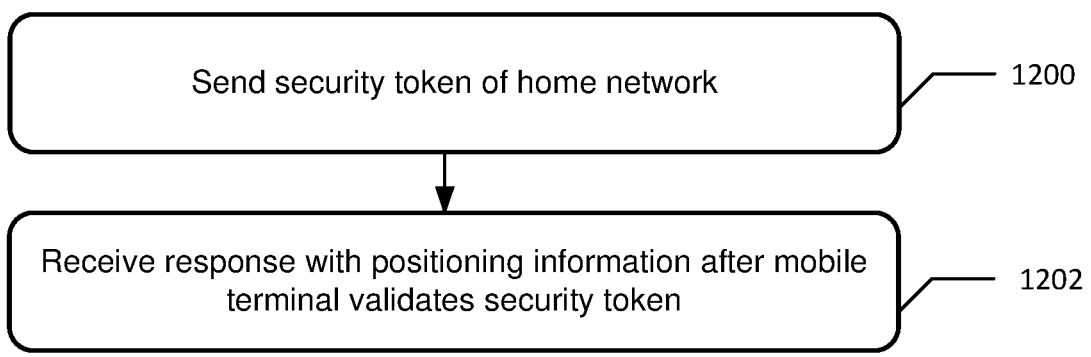
FIG. 12 is a flowchart of operations that may be performed by a network node, in accordance with some embodiments of the present disclosure.

Operations of network node 305 (implemented using the structure of the block diagram of FIG. 19) will now be addressed with reference to FIG. 6 and the flow chart of FIG. 12 according to some embodiments of inventive concepts. For example, modules may be stored in memory 1906 of FIG. 19, and these modules may provide instructions so that when the instructions of a module are executed by processor 1904, processor 1904 performs respective operations of the flow chart.

FIG. 12 shows operations that network node 319 may perform for secure verification of requests to position mobile terminal 106.

At 1200, network node 319 sends a security token of the home network to network node 307 of a visited network of mobile terminal 106. Network node 319 may send the security token of the home network to the network node 307 of the visited network in advance of a request to position mobile terminal 106.

At 1202, network node 319 receives a response from network node 307 of the visited network that may include positioning information of mobile terminal 106 after mobile terminal 106 validates the security token.

The security token may be, but is not limited to, a message authentication code (MAC); a digital signature; and a defined value.

Figure 7:
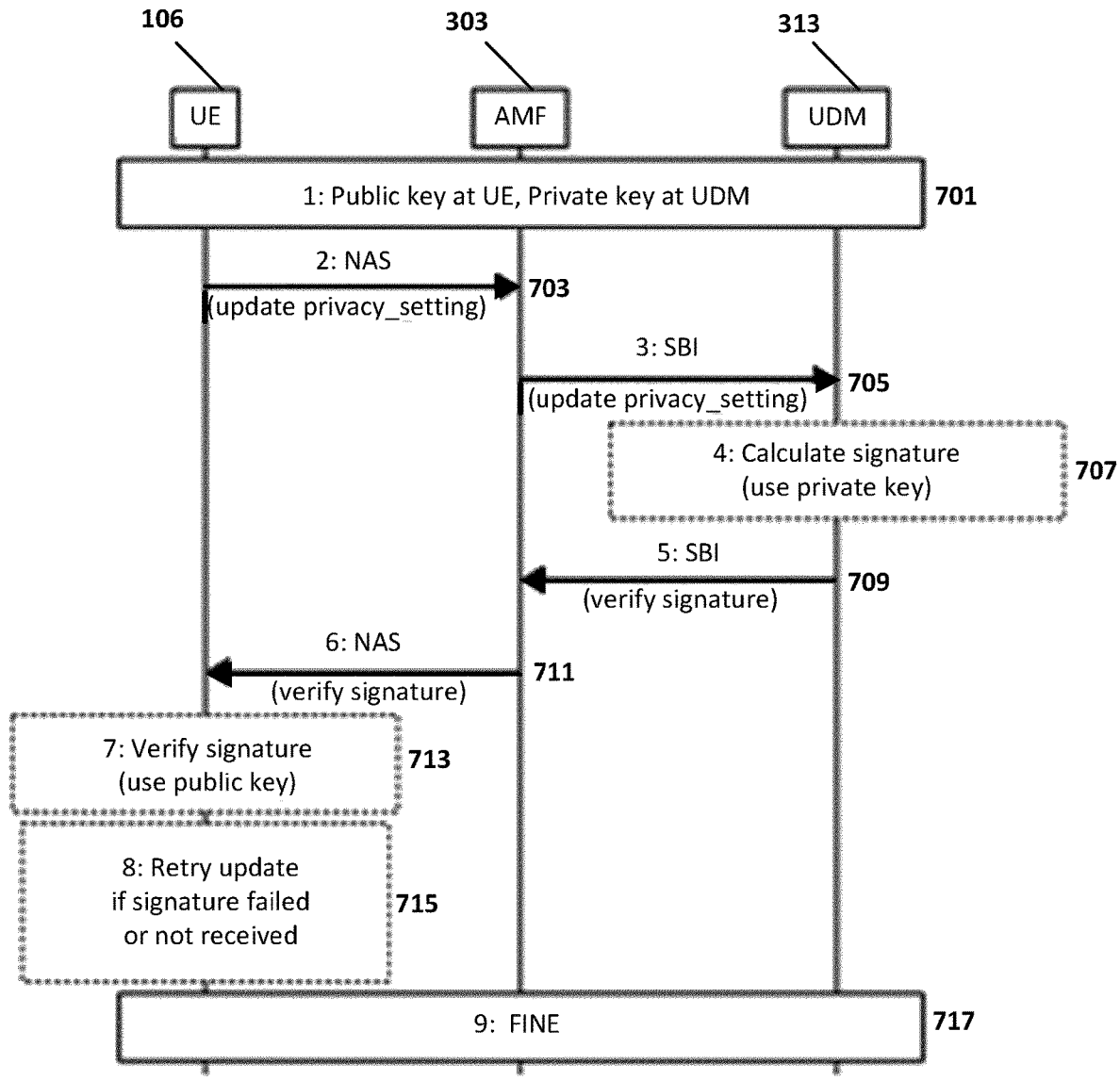
FIG. 7 is a message sequence for updating privacy profile settings, in accordance with some embodiments of the present disclosure.

In some embodiments, other variants of the operations of FIGS. 6 and 10 are shown in FIG. 7. The variants may include, but are not limited to: UDM 313 replaying privacy profile setting to UE 106 along with a digital signature for verification; and/or UDM 313 sending HASH of privacy profile setting to UE 106 for verification.

Figure 13A:
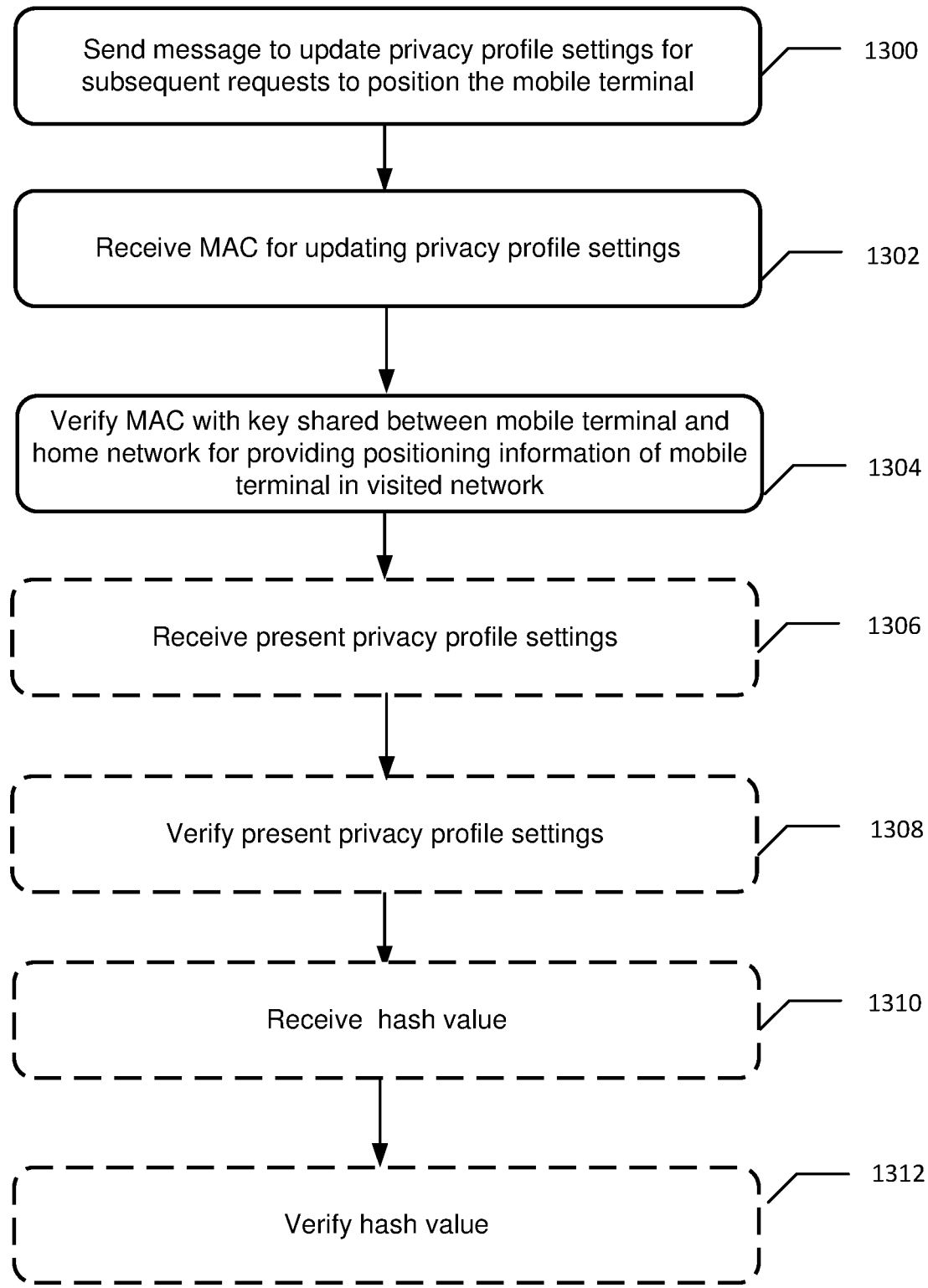
FIGS. 13A and 13B are flowcharts of operations that may be performed by a mobile terminal, in accordance with some embodiments of the present disclosure.
Figure 13B:
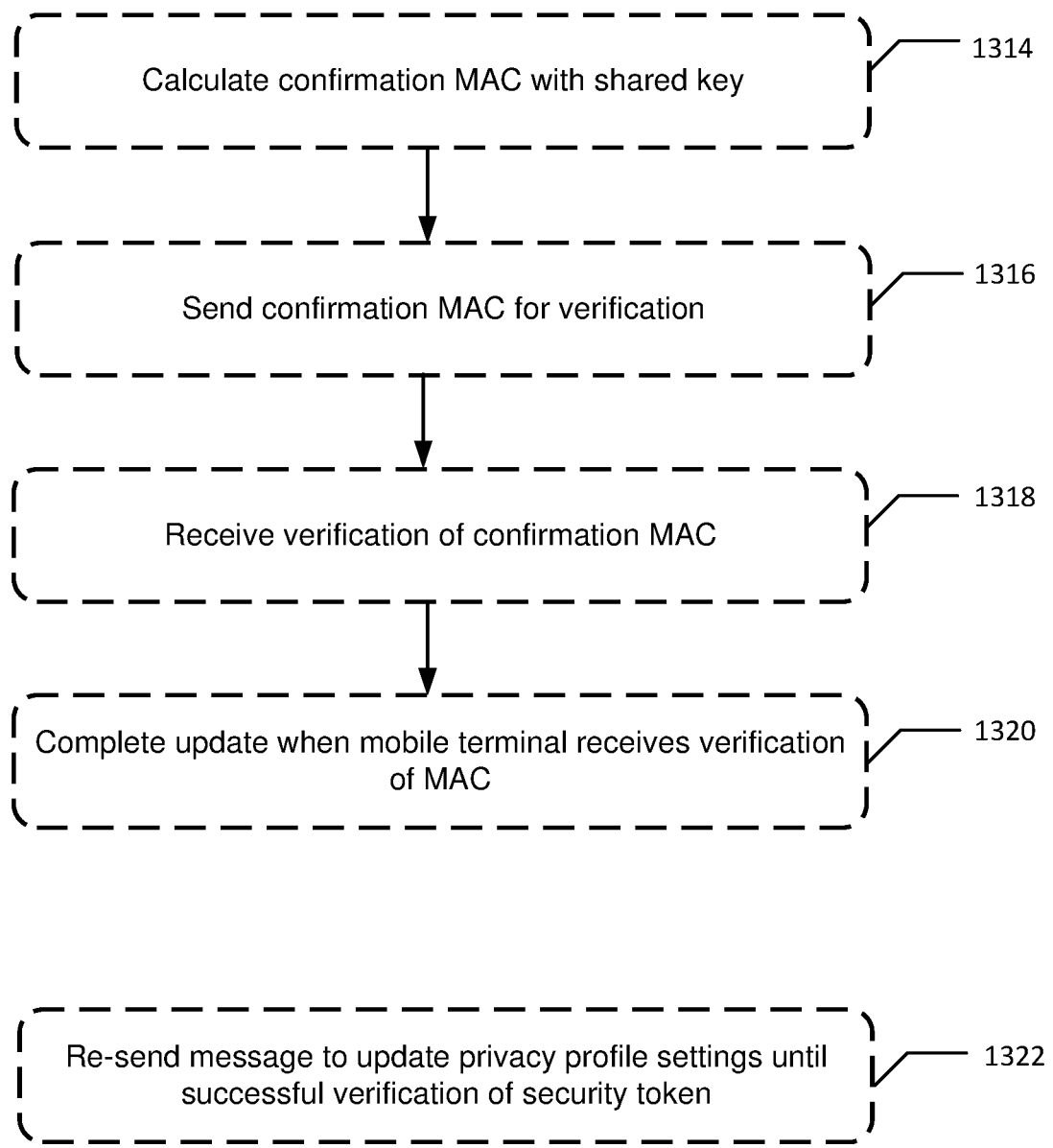

Operations of mobile terminal 106 (implemented using the structure of the block diagram of FIG. 18) will now be addressed with reference to the flow charts of FIGS. 13A and 13B according to some embodiments of inventive concepts. For example, modules may be stored in memory 1820 of FIG. 18, and these modules may provide instructions so that when the instructions of a module are executed by processor 1810, processor 1810 performs respective operations of the flow charts.

Referring to FIGS. 13A and 13B, operations of mobile terminal 106 may be performed for securely updating privacy profile settings of mobile terminal 106 to network node 313 for subsequent requests to position mobile terminal 106.

At 1300, mobile terminal 106 sends a message to a network node 303 to update the privacy profile settings of mobile terminal 106 for subsequent requests to position mobile terminal 106.

At 1302, responsive to sending the message, mobile terminal 106 receives a security token from the network for updating the privacy profile settings of mobile terminal 106. The security token may include, but is not limited to, a message authentication code (MAC).

At 1304, mobile terminal 106 verifies the MAC with a key that is shared between mobile terminal 106 and the communications network.

At 1306, mobile terminal 106 presents privacy profile settings of mobile terminal 106 with the security token.

At 1308, mobile terminal 106 verifies the present privacy profile settings of mobile terminal 106.

At 1310, mobile terminal 106 receives a hash value with the security token.

At 1312, mobile terminal 106 verifies the hash value.

At 1314, mobile terminal 106 calculates a confirmation MAC using the shared key.

At 1316, mobile terminal 106 sends the confirmation MAC to network node 303 for verification.

At 1318, mobile terminal 106 receives verification of the confirmation MAC.

At 1320, mobile terminal 106 completes the update when mobile terminal 106 receives verification of the MAC.

If mobile terminal 106 does not receive the security token in the operation of 1302, at 1322, mobile terminal 106 may re-send the message of operation 1302 to network node 303 to update the privacy profile settings of mobile terminal 106 for subsequent requests to position mobile terminal 106 until mobile terminal 106 receives successful verification of the security token.

Various operations from the flow chart of FIG. 13B may be optional with respect to some embodiments of mobile terminals and related methods. For example, operations of blocks 1306, 1308, 1310, 1312, 1314, 1316, 1318, 1320, and 1322 of FIGS. 13A and 13B may be optional.

Figure 14A:
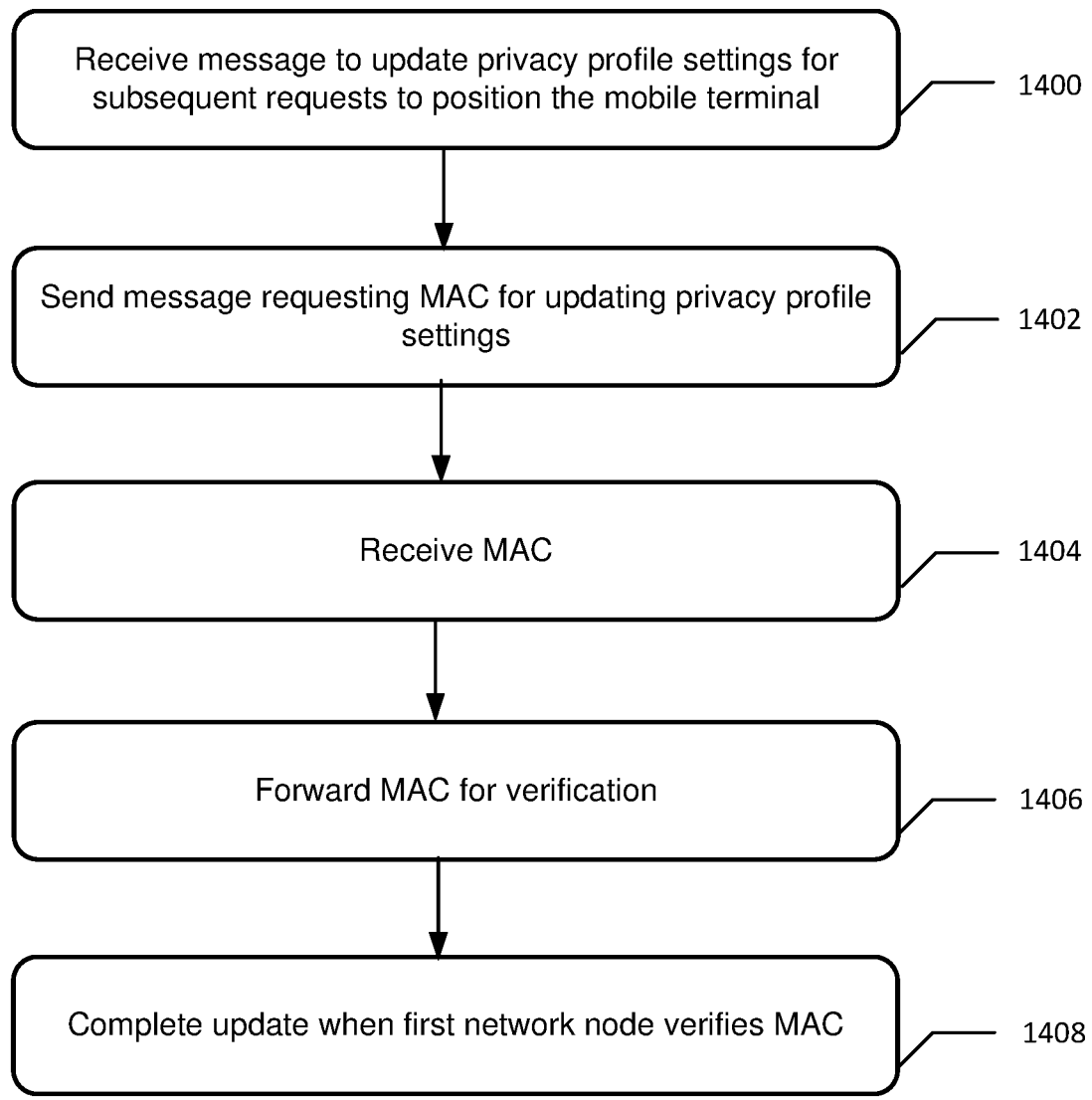
FIGS. 14A and 14B are flowcharts of operations that may be performed by a network node, in accordance with some embodiments of the present disclosure.
Figure 14B:
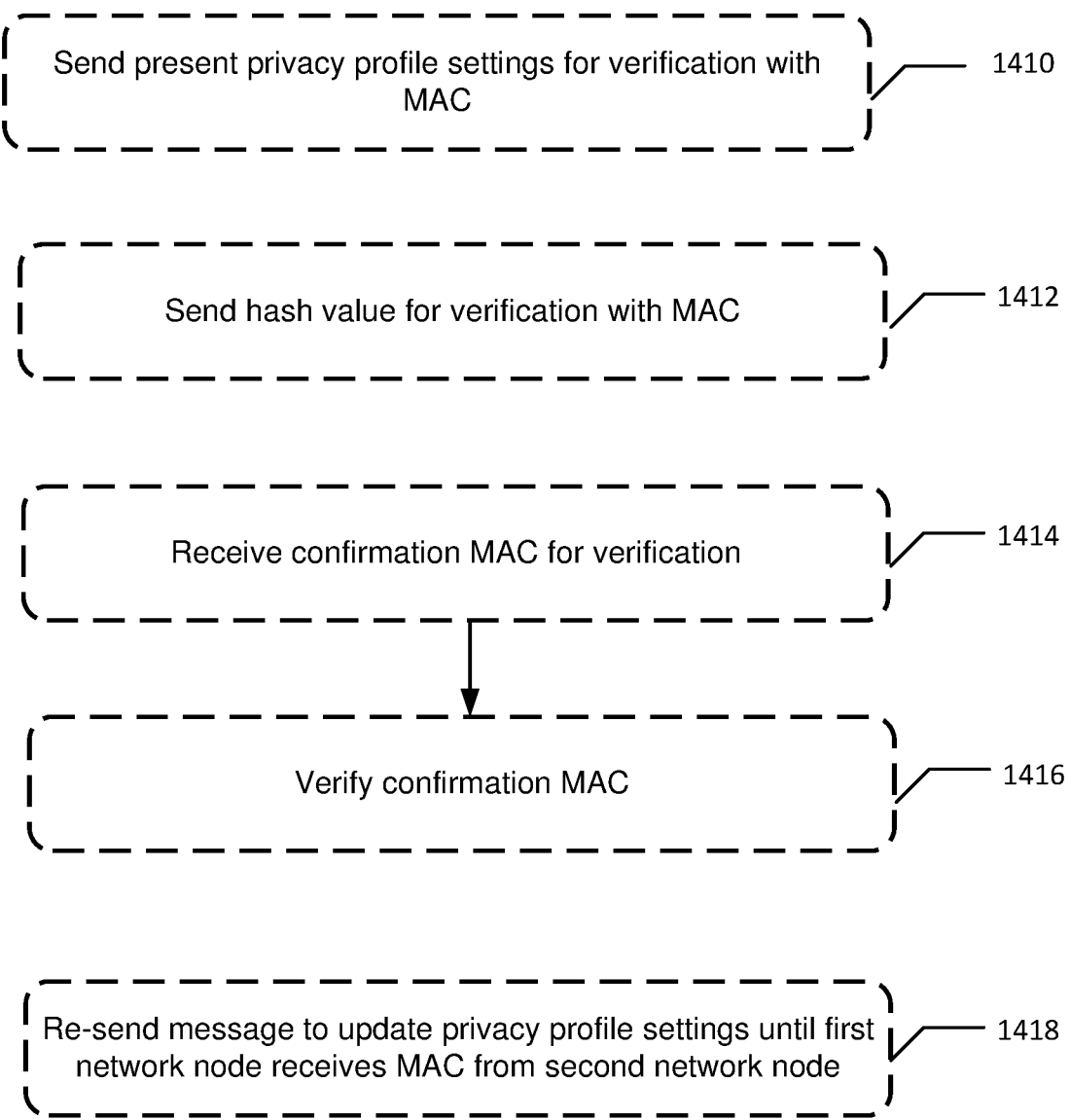

Operations of network node 313 (implemented using the structure of the block diagram of FIG. 19) will now be addressed with reference to FIG. 6 and the flow charts of FIGS. 14A and 14B according to some embodiments of inventive concepts. For example, modules may be stored in memory 1906 of FIG. 19, and these modules may provide instructions so that when the instructions of a module are executed by processor 1904, processor 1904 performs respective operations of the flow charts.

Referring to FIGS. 14A and 14B, operations of network node 313 may be performed for securely updating privacy profile settings of mobile terminal 106 for subsequent requests to position mobile terminal 106.

At 1400, network node 313 receives a message to update the privacy profile settings of mobile terminal 106 for subsequent requests to position mobile terminal 106.

At 1402, network node 313 sends a message to a second network node 601 requesting a security token for updating the privacy profile settings of mobile terminal 106. The security token may include, but is not limited to, a MAC.

At 1404, responsive to sending the message, network node 313 receives the MAC from second network node 601 for updating the privacy profile settings of mobile terminal 106.

At 1406, network node 313 forwards the MAC towards mobile terminal 106 for verification of the MAC.

At 1408, network node 313 completes the update when network node 313 verifies the MAC.

At 1410, network node 313 sends present privacy profile settings of mobile terminal 106 towards mobile terminal 106 for verification with the MAC.

At 1412, network node 313 sends a hash value with the security token towards mobile terminal 106 for verification with the MAC.

At 1414, network node 313 receives a confirmation MAC for mobile terminal 106 for verification.

At 1416, network node 313 verifies the confirmation MAC.

If the security token is not received, network node 313 may re-send the message to network node 601 to update the privacy profile settings of mobile terminal 106 for subsequent requests to position mobile terminal 106 until network node 313 receives the MAC from network node 601.

Various operations from the flow chart of FIG. 14B may be optional with respect to some embodiments of network nodes and related methods. For example, operations of blocks 1410, 1412, 1414, 1416, and 1418 of FIG. 14B may be optional.

Figure 15:
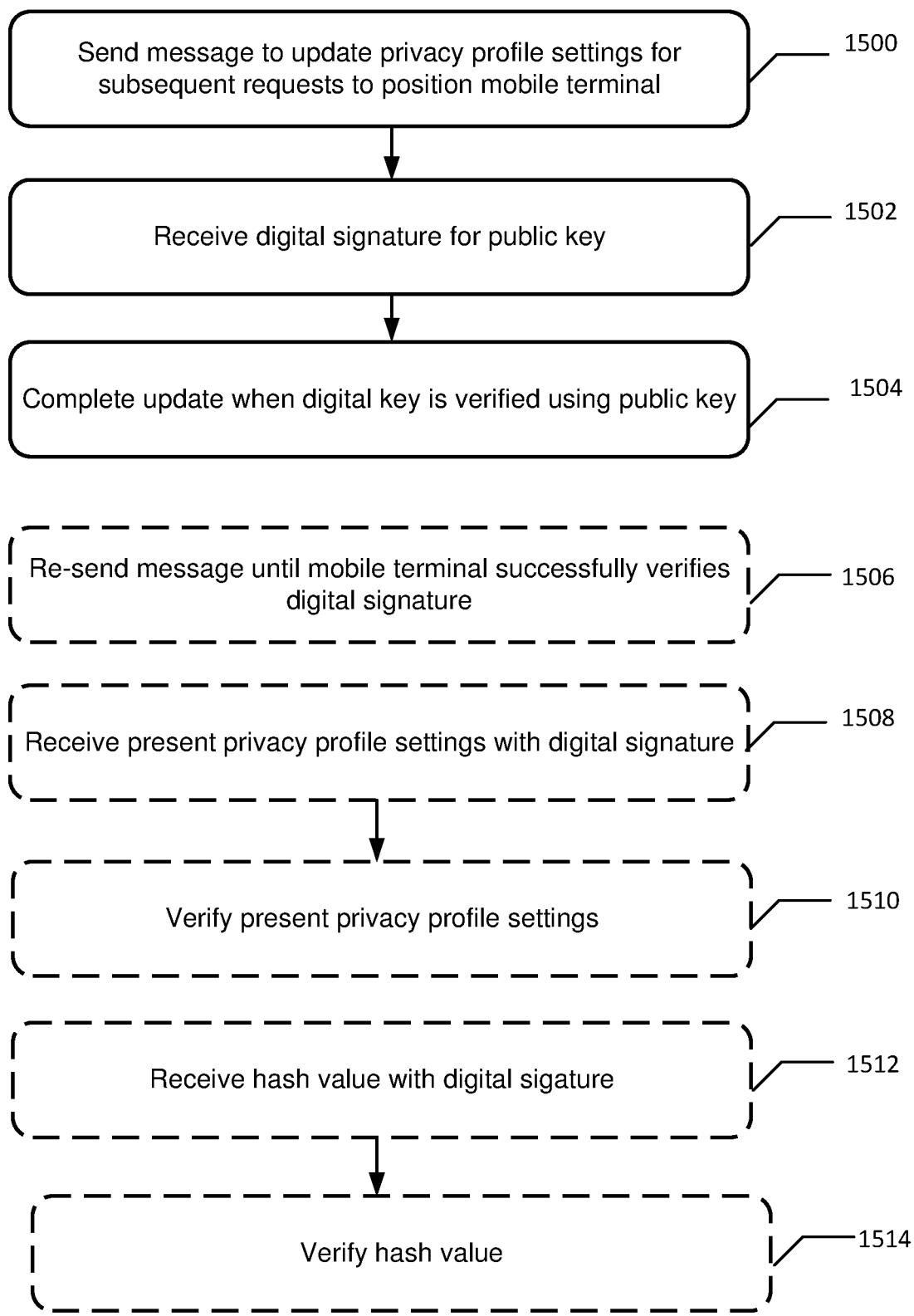
FIG. 15 is a flowchart of operations that may be performed by a mobile terminal, in accordance with some embodiments of the present disclosure.

Operations of mobile terminal 106 (implemented using the structure of the block diagram of FIG. 18) will now be addressed with reference to FIG. 7 and the flow chart of FIG. 15 according to some embodiments of inventive concepts. For example, modules may be stored in memory 1820 of FIG. 18, and these modules may provide instructions so that when the instructions of a module are executed by processor 1810, processor 1810 performs respective operations of the flow charts.

Referring to FIGS. 7 and 15, operations of mobile terminal 106 may be performed for securely updating privacy profile settings of mobile terminal 106 to network node 313 for subsequent requests to position mobile terminal 106.

At 1500, mobile terminal 106 sends a message to network node 313 to update the privacy profile settings of mobile terminal 106 for subsequent requests to position mobile terminal 106. Mobile terminal 106 may include a public key and network node 313 may include a private key.

At 1502, responsive to sending the message, mobile terminal 106 receives a digital signature for the public key from the network.

At 1504, mobile terminal 106 completes the update when the digital signature is verified using the public key of mobile terminal 106.

If the digital signature is not received by mobile terminal 106 or is not verified by mobile terminal 106, at 1506, mobile terminal 106 may re-send the message to network node 313 to update the privacy profile settings of mobile terminal 106 for subsequent requests to position mobile terminal 106 until mobile terminal 106 successfully verifies the digital signature.

At 1508, mobile terminal 106 receives present privacy profile settings of mobile terminal 106 with the digital signature.

At 1510, mobile terminal 106 verifies the present privacy profile settings.

At 1512, mobile terminal 106 receives a hash value with the digital signature.

At 1514, mobile terminal 106 verifies the hash value.

Various operations from the flow chart of FIG. 15 may be optional with respect to some embodiments of mobile terminals and related methods. For example, operations of blocks 1506, 1508, 1510, 1512, and 1514 of FIG. 15 may be optional.

Figure 16:
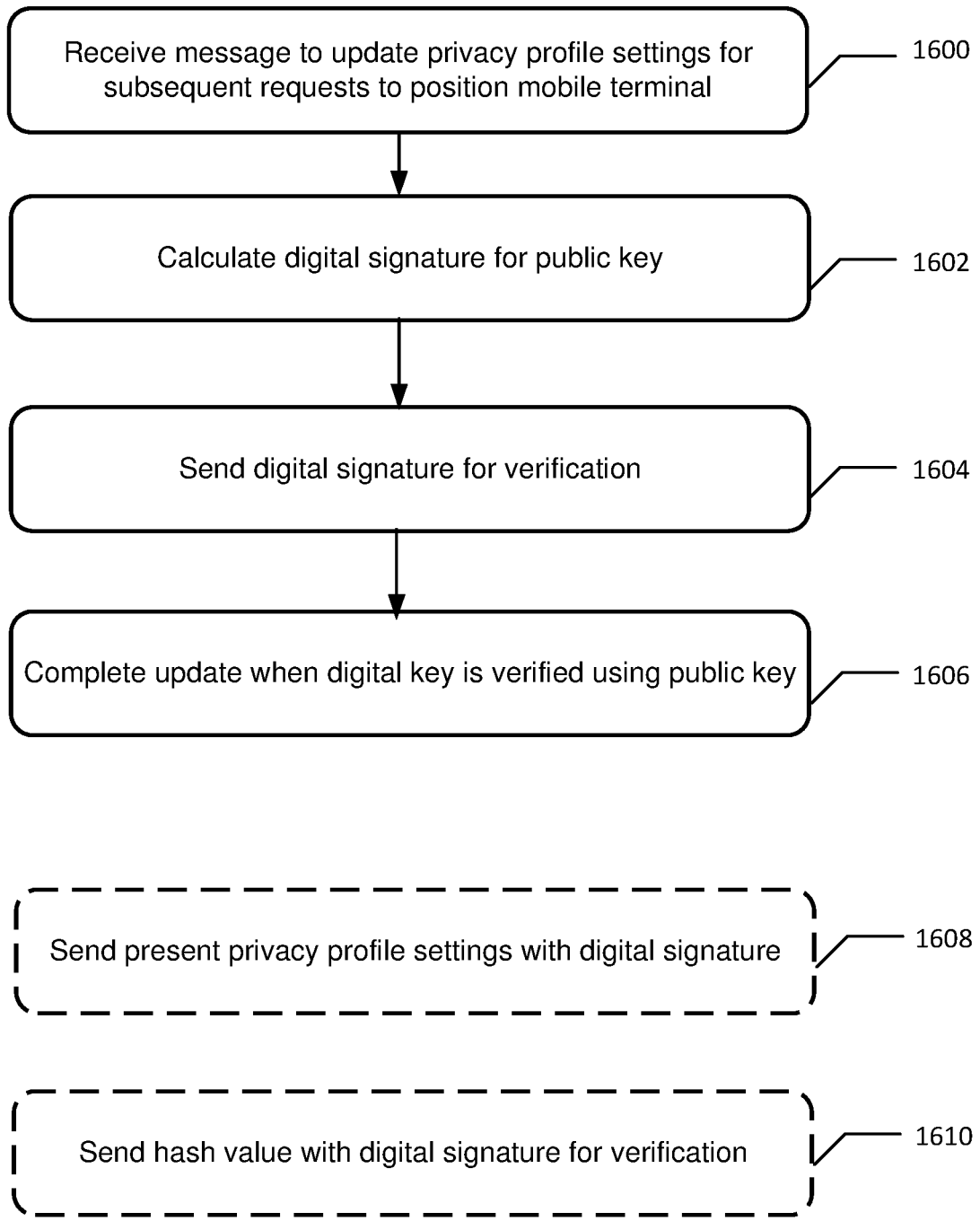
FIG. 16 is a flowchart of operations that may be performed by a network node, in accordance with some embodiments of the present disclosure.

Operations of network node 313 (implemented using the structure of the block diagram of FIG. 19) will now be addressed with reference to FIG. 7 and the flow chart of FIG. 16 according to some embodiments of inventive concepts. For example, modules may be stored in memory 1906 of FIG. 19, and these modules may provide instructions so that when the instructions of a module are executed by processor 1904, processor 1904 performs respective operations of the flow charts.

Referring to FIG. 16, operations of network node 313 may be performed for securely updating privacy profile settings of mobile terminal 106 for subsequent requests to position mobile terminal 106.

At 1600, network node 313 receives a message to update the privacy profile settings of mobile terminal 106 for subsequent requests to position mobile terminal 106. Mobile terminal 106 may include a public key and network node 313 may include a private key.

At 1602, responsive to receiving the message, network node 313 calculates a digital signature for the private key.

At 1604, network node 313 sends the digital signature toward mobile terminal 106 for verification.

At 1606, network node 313 completes the update when the digital signature is verified by mobile terminal 106 using the public key of mobile terminal 106.

At 1608, network node 313 sends present privacy settings of mobile terminal 106 with the digital signature towards mobile terminal 106 for verification.

At 1610, network node 313 sends a hash value with the digital signature towards mobile terminal 106 for mobile terminal 106 to verify.

Various operations from the flow chart of FIG. 16 may be optional with respect to some embodiments of network nodes and related methods. For example, operations of blocks 1608 and 1610 of FIG. 16 may be optional.

Some embodiments for UE 106 to provision its privacy profile settings to UDM 313/UDR 311 discussed above may be based on a Control Plane signalling path between UE 106 and the UDM 313/UDR 311 via AMF 303 in the VPLMN. Such a mechanism may need support for the corresponding operations in AMF 303 of the VPLMN.

Figure 8:
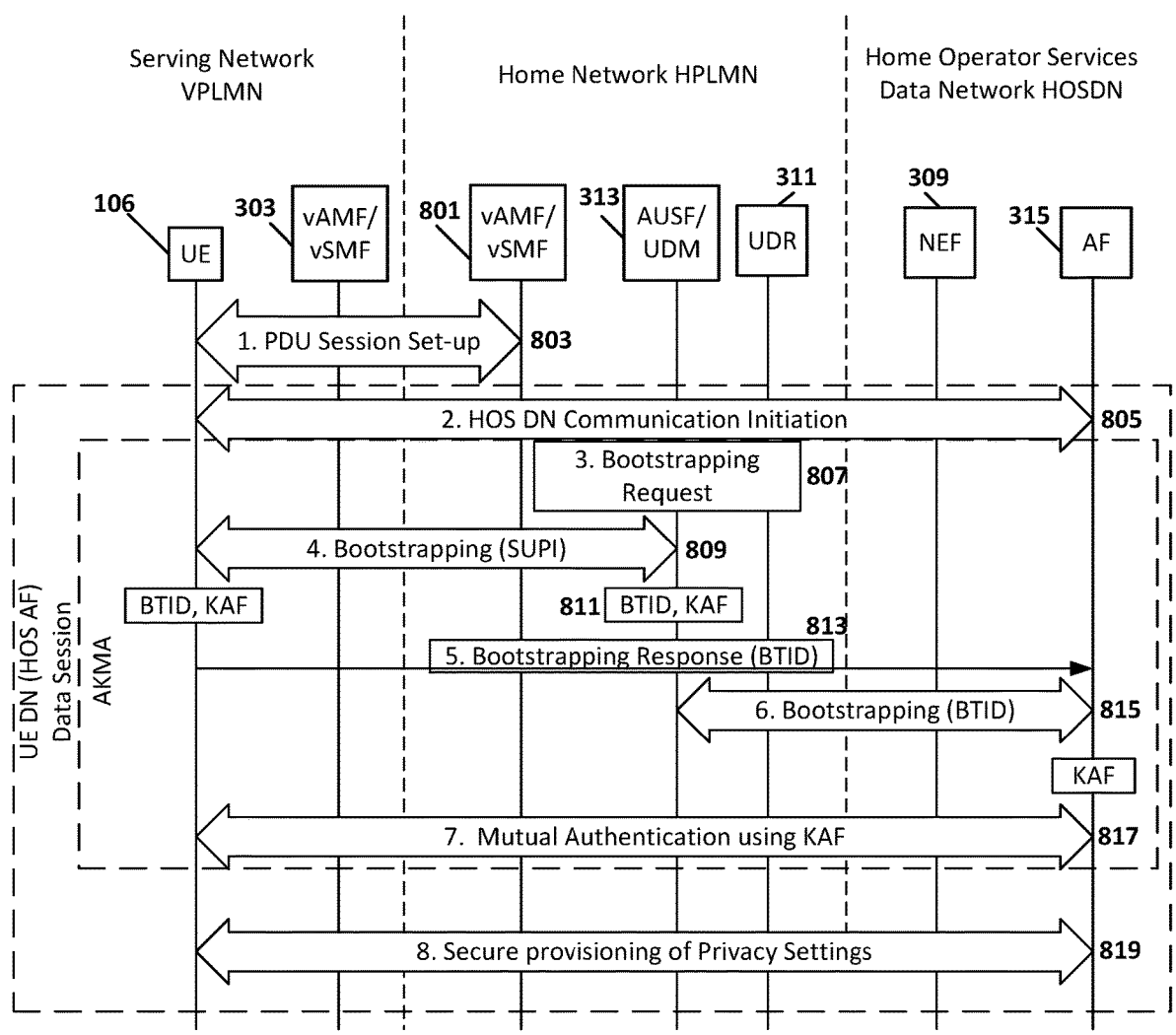
FIG. 8 is a message sequence for updating privacy profile settings, in accordance with some embodiments of the present disclosure.

Other embodiments for UE 106 to provision its privacy profile settings securely in UDM 313/UDR 311 may be based on a User Plane signalling path without support at the VPLMN. FIG. 8 is a message sequence for updating privacy profile settings, in accordance with some embodiments of the present disclosure.

Referring to FIG. 8, at 803, UE 106 may establish a PDN connection towards a Application function within a data Network controlled by the Home Operator (i.e. Home Operator Services Data Network) 100b.

At 805, UE 106 and AF 315 may communicate with each other using a User Plane path enabled by the 5GC. AF may enable a service to UE 106 for self-management of operator services, which may include self-management of privacy profile settings. At 806, AF 315 may request UE 106 to authenticate making use of the generic Bootstrapping authentication architecture principles which are now being evolved to 5GC in TR 33.835 (V.0.3.0).

At 809-815, UE 106 and AF 315 may execute bootstrapping with UDM/AUSF 313 of the HPLMN. As a result, UE 106 and AF 315 may agree with security Key, Kaf, which may be further used at 817 for mutual authentication between UE 106 and AF 315 and establishment of further security keys.

At 819, UE 106 may provision its privacy profile settings in AF 315 in a secure manner protected end to end.

Figure 9:
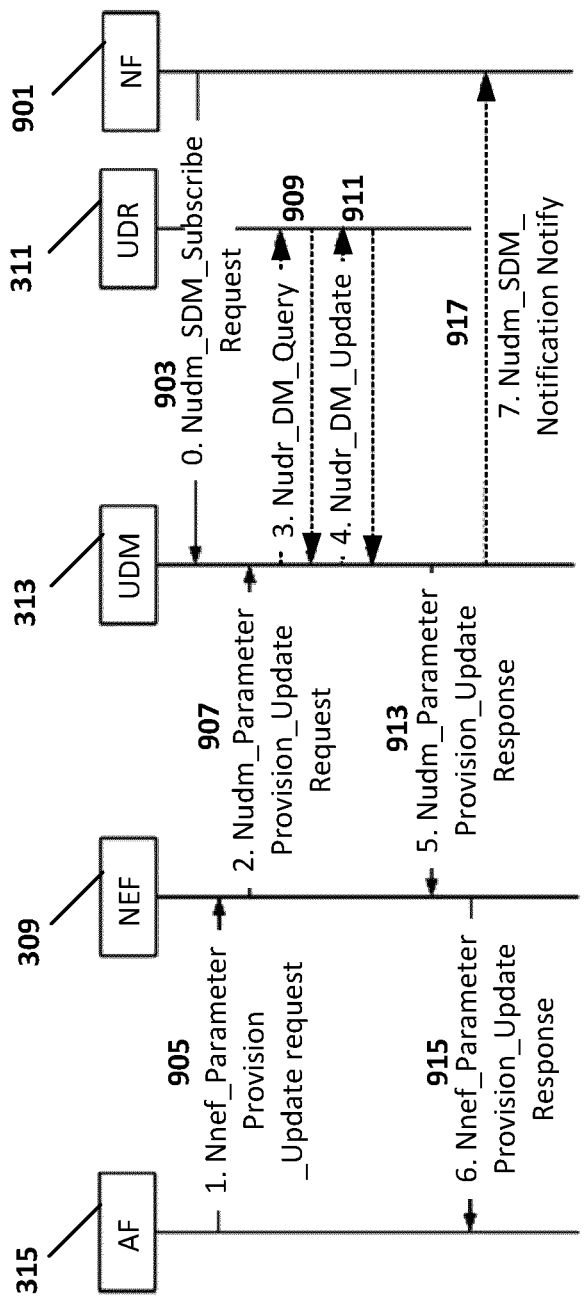
FIG. 9 is a message sequence for updating privacy profile settings, in accordance with some embodiments of the present disclosure.

Referring to FIG. 8, in some embodiments, UE 106 privacy profile settings may be provisioned into the UDM/AUSF 313 using external parameter procedures, such as described in 3GPP TS 23.502 (V.15.4.1) illustrated in FIG. 9.

FIG. 9 illustrates Nnef parameter provision update and response operations. At 905-915, AF 315 may provision UE 106's privacy profile settings in UDM 313/UDR 311 via NEF 309. The operations of FIG. 9 may also allow relevant NFs to be notified of the change of the UE 106's privacy profile settings. For example, at 903, a GMLC which may have been subscribed in UDM 313 to this type of notification may receive a notification of the update of UE 106's privacy profile settings (917).

Alternatively, AF 315 may be part of the Provisioning infrastructure of the HPLMN and may be able to provision UE 106's privacy profile settings directly into UDR 311.

Figure 17:
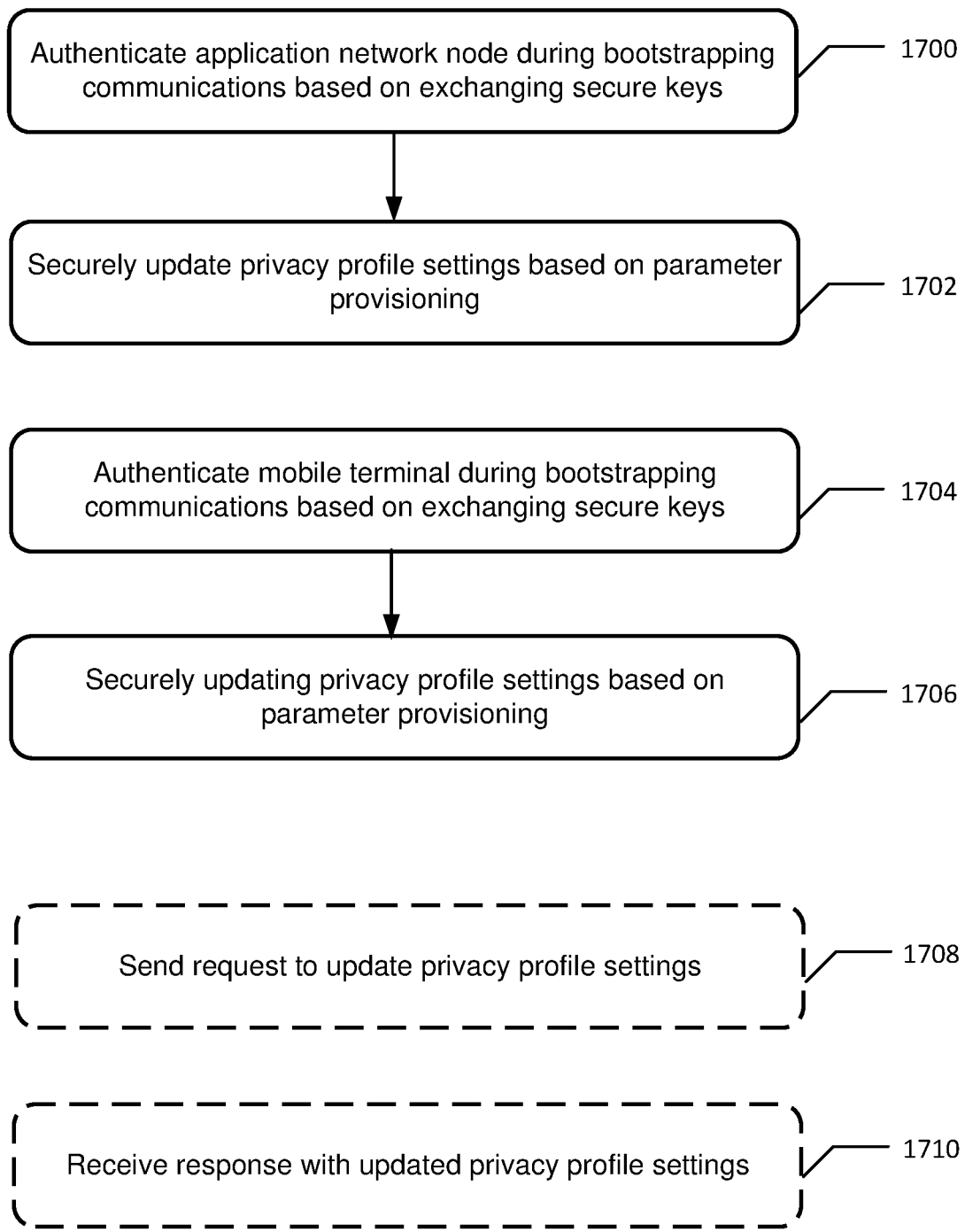
FIG. 17 is a flowchart of operations that may be performed by a mobile terminal and by a network node, in accordance with some embodiments of the present disclosure.

Operations of mobile terminal 106 (implemented using the structure of the block diagram of FIG. 18) will now be addressed with reference to FIGS. 8 and 9 and the flow chart of FIG. 17 according to some embodiments of inventive concepts. For example, modules may be stored in memory 1820 of FIG. 18, and these modules may provide instructions so that when the instructions of a module are executed by processor 1810, processor 1810 performs respective operations of the flow charts.

Referring to FIGS. 8, 9, and 17, operations of mobile terminal 106 may be performed for securely updating privacy profile settings of mobile terminal 106 with an application network node 315 for subsequent requests to position mobile terminal 106.

At 1700, mobile terminal 106 authenticates application network node 315 during bootstrapping communications based on exchanging secure keys with application network node 315.

At 1702, mobile terminal 106 securely updates the privacy profile settings of mobile terminal 106 based on parameter provisioning.

Operations of network node 315 (implemented using the structure of the block diagram of FIG. 19) will now be addressed with reference to FIGS. 8 and 9 and the flow chart of FIG. 17 according to some embodiments of inventive concepts. For example, modules may be stored in memory 1906 of FIG. 19, and these modules may provide instructions so that when the instructions of a module are executed by processor 1904, processor 1904 performs respective operations of the flow charts.

Referring to FIG. 17, operations of network node 315 may be performed for securely updating privacy profile settings of mobile terminal 106 with application network node 315 for subsequent requests to position mobile terminal 106.

At 1704, network node 315 authenticates mobile terminal 106 during bootstrapping communications based on exchanging secure keys with mobile terminal 106. Network node 315 may send a request toward a network node to update the privacy profile settings of mobile terminal 106. Network node 315 may receive a response from the network node with the updated privacy profile settings of mobile terminal 106. The network node may be, but is not limited to, network exposure network node 309 or unified data repository node 311.

At 1706, network node 315 securely updates the privacy profile settings of mobile terminal 106 based on parameter provisioning.

Various operations from the flow chart of FIG. 17 may be optional with respect to some embodiments of network nodes and related methods. For example, operations of blocks 1708 and 1710 of FIG. 17 may be optional.

Figure 18:
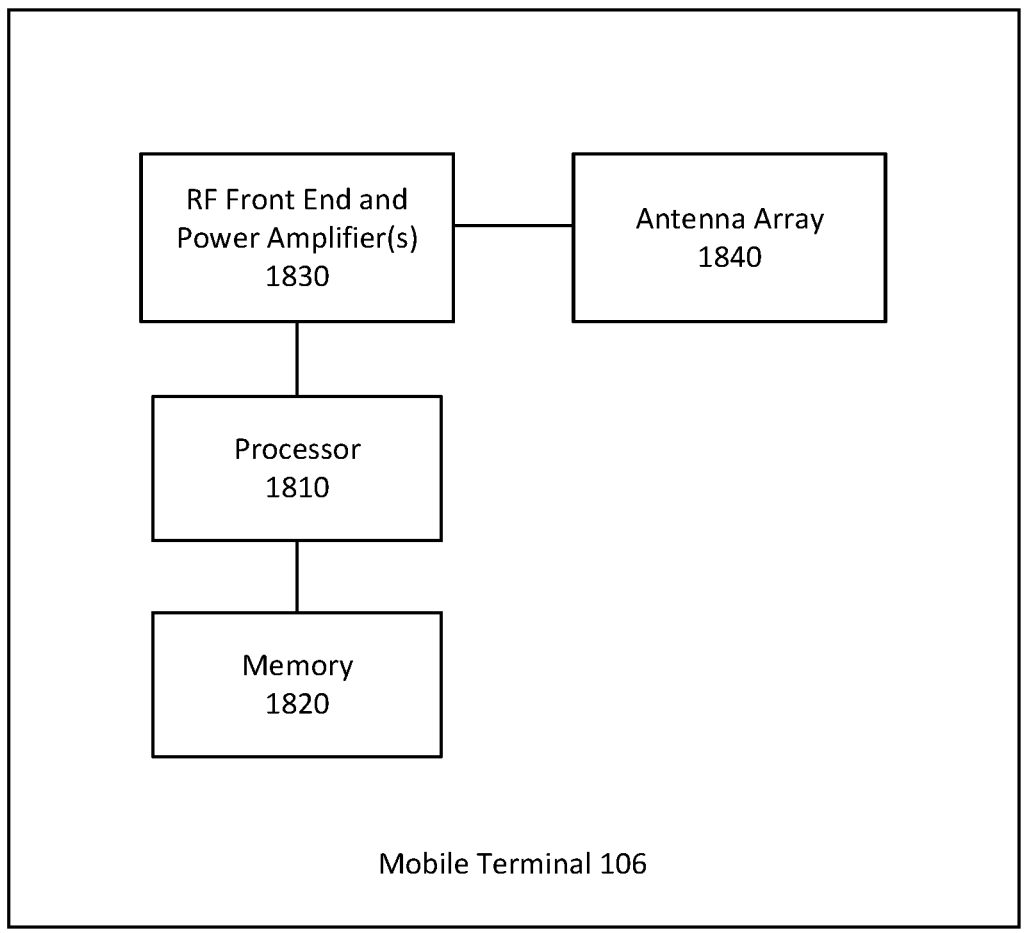
FIG. 18 is a block diagram of elements of a mobile terminal that are configured according to some embodiments of the present disclosure.

Example Terminal and Network Node:

FIG. 18 is a block diagram illustrating a mobile terminal 106 that is configured according to some embodiments. The mobile terminal 106 can include, without limitation, a wireless terminal, a wireless communication device, a wireless communication terminal, a terminal node/UE/device, etc. The mobile terminal 106 includes a RF front-end 1830 comprising one or more power amplifiers the transmit and receive through antennas of an antenna array 1840 to provide uplink and downlink radio communications with a radio network node (e.g., a base station, eNB, gNB, etc.) of a telecommunications network. Instead of or in addition to the RF front-end 1830, the mobile terminal 106 may include a light reception front-end configured to receive light signaling such from a Light WiFi AP. Mobile terminal 106 further includes a processor circuit 1810 (also referred to as a processor) coupled to the RF front end 1830 and a memory circuit 1820 (also referred to as memory). The memory 1820 stores computer readable program code that when executed by the processor 1810 causes the processor 1810 to perform operations according to embodiments disclosed herein.

Figure 19:
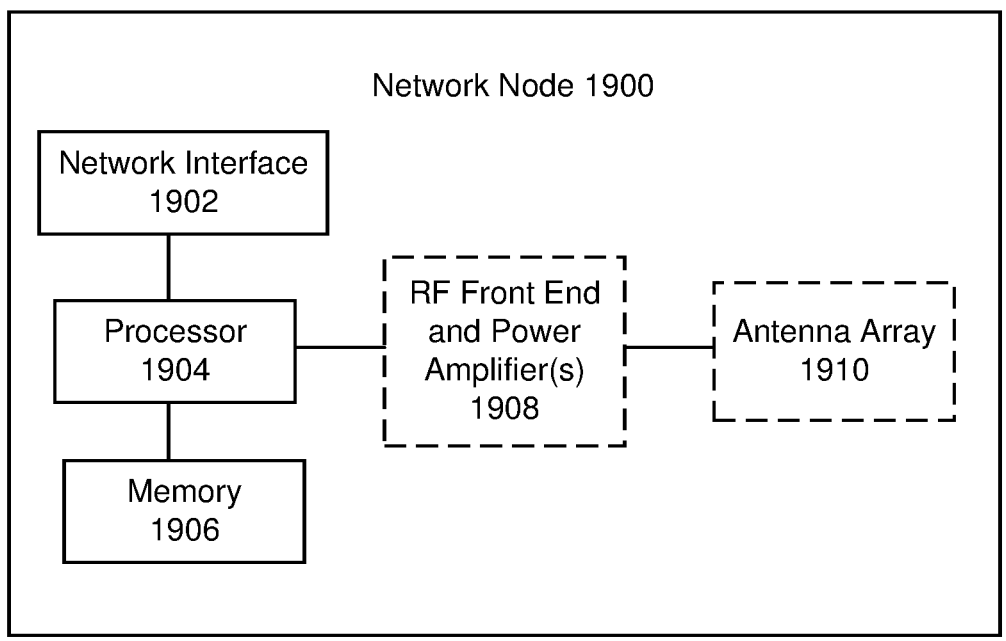
FIG. 19 is a block diagram of elements of a network node that are configured according to some embodiments of the present disclosure.

FIG. 19 is a block diagram illustrating a network node 1900 (e.g., a base station, eNB, gNB, etc.) of a telecommunications network. The network node 1900 includes a processor circuit 1904 (also referred to as a processor), a memory circuit 1906 (also referred to as memory), and a network interface 1902 (e.g., wired network interface and/or wireless network interface) configured to communicate with other network nodes. The network node 1900 may be configured as a radio network node containing a RF front-end and/or a light signaling front-end with one or more power amplifiers 1908 that transmit and receive through antennas of an antenna array 1910. The memory 1906 stores computer readable program code that when executed by the processor 1904 causes the processor 1904 to perform operations according to embodiments disclosed herein.

Listing of Embodiments: Example Embodiments are discussed below. Reference numbers/letters are provided in parenthesis by way of example/illustration without limiting example embodiments to particular elements indicated by reference numbers/letters.

Embodiment 1. A method of operating a mobile terminal (106) for verifying at least one privacy profile setting for positioning of the mobile terminal to a location network node (305) in a communications network. The method includes receiving (405, 1000) a request from the location network node for the mobile terminal to provide a position of the mobile terminal. The method further includes checking (405, 1002) the at least one privacy profile setting of the mobile terminal for permission to provide position information of the mobile terminal. The method further includes determining (405, 1004) whether to send the positioning information of the mobile terminal to the location network node based on the checking the at least one privacy profile setting.

Embodiment 2. The method of Embodiment 1, wherein the checking grants permission to provide the positioning information, and wherein determining comprises sending the positioning information of the mobile terminal to the location network node.

Embodiment 3. The method of any of Embodiments 1 to 2, wherein the checking includes determining permission based on whether the mobile terminal is allowed or disallowed at the time of the request to provide the positioning information of the mobile terminal.

Embodiment 4. The method of any of Embodiments 1 to 3, wherein the checking includes determining permission based on generating a notification to a user of the mobile terminal for the user to respond to indicate whether the mobile terminal is allowed or disallowed to provide the positioning information of the mobile terminal. The checking further includes receiving a response to the notification from the user indicating whether the mobile terminal is allowed or disallowed to provide the positioning information of the mobile terminal.

Embodiment 5. The method of any of Embodiments 1 to 4, wherein checking includes determining permission based on whether at least one condition is met, and wherein the at least one condition includes allowing or disallowing providing the position information of the mobile terminal using a specified positioning measurement.

Embodiment 6. The method of any of Embodiments 1 to 5, wherein the specified positioning measurement includes measuring signals received from a at least one of: a WiFi access point and a Bluetooth access point.

Embodiment 7. The method of any of Embodiments 1 to 6, wherein the checking denies permission to provide the positioning information, and the determining includes not sending the positioning information to the location network node.

Embodiment 8. The method of any of Embodiments 1 to 7, wherein the checking denies permission to provide the positioning information, and the determining includes not sending the positioning information to the location network node. The determining further includes recording (1006) the denial of permission by at least one of: updating the at least one privacy profile setting with the denial of permission, and recording the denial of permission in a memory of the mobile terminal.

Embodiment 9. The method of any of Embodiments 1 to 8, wherein the checking denies permission to provide the positioning information, and the determining includes not sending the positioning information to the location network node. The determining further includes generating (1008) a notification to the user of the denial of permission.

Embodiment 10. The method of any of Embodiments 1 to 9, wherein the checking denies permission to provide the positioning information, and the determining includes not sending the positioning information to the location network node. The determining further includes sending (1010) a message to a gateway mobile location network node comprising the denial of permission.

Embodiment 11. The method of any of Embodiments 1 to 10, wherein the checking denies permission to provide the positioning information, and the determining includes sending limited positioning information to the location network node.

Embodiment 12. The method of any of Embodiments 1 to 11, wherein the checking denies permission to provide the positioning information, and the determining includes ignoring the denial of permission and sending the positioning information of the mobile terminal to the location network node.

Embodiment 13. The method of any of Embodiments 1 to 12, wherein the positioning information includes at least one of: location measurements and a location estimate.

Embodiment 14. A mobile terminal (106) configured to operate to verify at least one privacy profile setting for positioning of the mobile terminal to a location network node (305) in a communications network. The mobile terminal includes a processor (1810); and memory (1820) coupled with the processor. The memory includes instructions that when executed by the processing circuitry causes the mobile terminal to perform operations according to any of Embodiments 1-13.

Embodiment 15. A computer program including program code to be executed by a processor (1810) of a mobile terminal (106) configured to operate to verify at least one privacy profile setting for positioning of the mobile terminal to a location network node (305) in a communications network, whereby execution of the program code causes the mobile terminal (106) to perform operations according to any of Embodiments 1-13.

Embodiment 16. A method of operating a mobile terminal (106) for secure verification of requests to position the mobile terminal in a communications network. The method includes receiving (403, 405, 1100) a security token of a home network. The method further includes generating (405, 1102) an authentication decision for the mobile terminal. The authentication decision includes validating the security token of the home network. The method further includes communicating positioning information of the mobile terminal to a network node (405, 1104) of the visited network when the authentication decision validates the security token.

Embodiment 17. The method of Embodiment 16, wherein the security token is at least one of: a message authentication code (MAC); a digital signature; and a defined value.

Embodiment 18. The method of any of Embodiments 16 to 17, wherein the defined value includes a one-time use nonce, wherein the nonce was pre-shared with the mobile terminal operation by including the nonce in a message sent to the mobile terminal.

Embodiment 19. The method of any of Embodiments 16 to 18, wherein the operation for receiving the security token of the home network includes receiving the security token of the home network from a network node (305) of a visited network.

Embodiment 20. A mobile terminal (106) configured to operate to securely verify requests to position the mobile terminal in a communications network. The mobile terminal includes a processor (1810); and memory (1820) coupled with the processor. The memory includes instructions that when executed by the processing circuitry causes the mobile terminal to perform operations according to any of Embodiments 16-19.

Embodiment 21. A computer program including program code to be executed by a processor (1810) of a mobile terminal (106) configured to securely verify requests to position the mobile terminal in a communications network, whereby execution of the program code causes the mobile terminal (106) to perform operations according to any of Embodiments 16 to 19.

Embodiment 22. A method of operating a network node of a home network (319) for secure verification of requests to position a mobile terminal in a communications network. The method includes sending (401, 1200) a security token of the home network to a network node of a visited network (307) of the mobile terminal. The method further includes receiving (407, 1202) a response from the network node of the visited network (307) including positioning information of the mobile terminal after the mobile terminal validates the security token.

Embodiment 23. The method of Embodiment 22, wherein, the security token is at least one of: a message authentication code (MAC); a digital signature; and a defined value.

Embodiment 24. The method of any of Embodiments 22 to 23, wherein the defined value includes a one-time use nonce, wherein the nonce was pre-shared with the mobile terminal operation by including the nonce in a message sent to the mobile terminal.

Embodiment 25. The method of any of Embodiments 22 to 24, wherein the operation for sending the security token of the home network to a network node of a visited network includes: sending the security token of the home network to the network node of a visited network in advance of a request to position the mobile terminal.

Embodiment 26. A network node of a home network (319) configured to operate to securely verify requests to position the mobile terminal in a communications network. The network node includes a processor (1904); and memory (1906) coupled with the processor, wherein the memory includes instructions that when executed by the processing circuitry causes the network node to perform operations according to any of Embodiments 22 to 25.

Embodiment 27. A computer program comprising program code to be executed by a processor (1904) of a network node of a home network (319) configured to securely verify requests to position the mobile terminal in a communications network, whereby execution of the program code causes the network node (319) to perform operations according to any of Embodiments 22 to 25.

Embodiment 28. A method of operating a mobile terminal (106) for securely updating privacy profile settings of the mobile terminal to a network node (313) for subsequent requests to position the mobile terminal in a communications network. The method includes sending (603, 1300) a message to a network node (303) to update the privacy profile settings of the mobile terminal for subsequent requests to position the mobile terminal. The method further includes, responsive to sending the message, receiving (615, 1302) a security token from the network for updating the privacy profile settings of the mobile terminal in the communications network. The security token includes a message authentication code (MAC). The security token further includes verifying (617, 1304) the MAC with a key that is shared between the mobile terminal and a home network in the communications network for providing positioning of the mobile terminal in a visited network in the communications network.

Embodiment 29. The method of Embodiment 28, further including: receiving (615, 1306) present privacy profile settings of the mobile terminal with the security token; and verifying (617, 1308) the present privacy profile settings.

Embodiment 30. The method of any of Embodiments 28 to 29, further including: receiving (615, 1310) a hash value with the security token; and verifying (617, 1312) the hash value.

Embodiment 31. The method of any of Embodiments 28 to 30, further including calculating (619, 1314) a confirmation MAC using the shared key. The method further includes sending (621, 1316) the confirmation MAC to the network node for verification. The method further includes receiving (627, 1318) verification of the confirmation MAC. The method further includes completing (627, 1320) the update when the mobile terminal receives verification of the MAC.

Embodiment 32. The method of any of Embodiments 28 to 31, wherein responsive to sending the message, the security token is not received and further includes re-sending (603, 1322) the message to the network node to update the privacy profile settings of the mobile terminal for subsequent requests to position the mobile terminal until the mobile terminal receives (627) successful verification of the security token.

Embodiment 33. A mobile terminal (106) configured to operate to securely update privacy profile settings of the mobile terminal to a network node (313) for subsequent requests to position the mobile terminal in a communications network. The mobile terminal includes a processor (1810); and memory (1820) coupled with the processor. The memory includes instructions that when executed by the processing circuitry causes the mobile terminal to perform operations according to any of Embodiments 28 to 32.

Embodiment 34. A computer program including program code to be executed by a processor (1810) of a mobile terminal (106) configured to securely update privacy profile settings of the mobile terminal to a network node (313) for subsequent requests to position the mobile terminal in a communications network, whereby execution of the program code causes the mobile terminal (106) to perform operations according to any of Embodiments 28 to 32.

Embodiment 35. A method of operating a first network node (313) for securely updating privacy profile settings of a mobile terminal (106) in a communications network for subsequent requests to position the mobile terminal in the communications network. The method includes receiving (605, 1400) a message to update the privacy profile settings of the mobile terminal for subsequent requests to position the mobile terminal in the communications network. The method further includes sending (607, 1402) a message to a second network node (601) requesting a security token for updating the privacy profile settings of the mobile terminal. The security token includes a MAC. The method further includes, responsive to sending the message, receiving (611, 1404) the MAC from the second network node for updating the privacy profile settings of the mobile terminal in the communications network. The method further includes forwarding (613, 1406) the MAC towards the mobile terminal for verification of the MAC. The method further includes completing (627, 1408) the update when the first network node verifies the MAC.

Embodiment 36. The method of Embodiment 35, further including sending (613, 1410) present privacy profile settings of the mobile terminal towards the mobile terminal for verification with the MAC.

Embodiment 37. The method of any of Embodiments 35 to 36, further including sending (613, 1412) a hash value with the security token towards the mobile terminal for verification with the MAC.

Embodiment 38. The method of any of Embodiments 35 to 37, further including receiving (623, 1414) a confirmation MAC for the mobile terminal for verification; and verifying (625, 1416) the confirmation MAC.

Embodiment 39. The method of any of Embodiments 35 to 38, wherein responsive to sending the message, the security token is not received. The method further includes re-sending (607, 1418) the message to the second network node to update the privacy profile settings of the mobile terminal for subsequent requests to position the mobile terminal until the first network node receives the MAC from the second network node.

Embodiment 40. A first network node (313) configured to operate to securely update privacy profile settings of a mobile terminal (106) in a communications network for subsequent requests to position the mobile terminal in the communications network. The first network node includes a processor (1904); and memory (1906) coupled with the processor. The memory includes instructions that when executed by the processing circuitry causes the first network node to perform operations according to any of Embodiments 35 to 39.

Embodiment 41. A computer program including program code to be executed by a processor (1904) of a first network node (313) configured to operate to securely update privacy profile settings of a mobile terminal (106) in a communications network for subsequent requests to position the mobile terminal in the communications network, whereby execution of the program code causes the first network node (313) to perform operations according to any of Embodiments 35 to 39.

Embodiment 42. A method of operating a mobile terminal (106) for securely updating privacy profile settings of the mobile terminal to a network node (313) for subsequent requests to position the mobile terminal in a communications network. The method includes sending (703, 1500) a message to a network node to update the privacy profile settings of the mobile terminal for subsequent requests to position the mobile terminal, wherein the mobile terminal includes a public key and the network node includes a private key. The method further includes, responsive to sending the message, receiving (711, 1502) a digital signature for the public key from the network. The method further includes completing (713, 717, 1504) the update when the digital signature is verified using the public key of the mobile terminal.

Embodiment 43. The method of Embodiment 42, wherein the digital signature is not received or is not verified. The method further includes re-sending (715, 1506) the message to the network node to update the privacy profile settings of the mobile terminal for subsequent requests to position the mobile terminal until the mobile terminal successfully verifies the digital signature.

Embodiment 44. The method of any of Embodiments 42 to 43, further including receiving (711, 1508) present privacy profile settings of the mobile terminal with the digital signature; and verifying (713, 1510) the present privacy profile settings.

Embodiment 45. The method of any of Embodiments 42 to 44, further including receiving (711, 1512) a hash value with the digital signature. The method further includes verifying (713, 1514) the hash value.

Embodiment 46. A mobile terminal (106) configured to operate to securely update privacy profile settings of the mobile terminal to a network node (313) for subsequent requests to position the mobile terminal in a communications network. The mobile terminal includes a processor (1810); and memory (1820) coupled with the processor. The memory includes instructions that when executed by the processing circuitry causes the mobile terminal to perform operations according to any of Embodiments 42 to 45.

Embodiment 47. A computer program including program code to be executed by a processor (1810) of a mobile terminal (106) configured to securely update privacy profile settings of the mobile terminal to a network node (313) for subsequent requests to position the mobile terminal in a communications network, whereby execution of the program code causes the mobile terminal (106) to perform operations according to any of Embodiments 42 to 45.

Embodiment 48. A method of operating a first network node (313) for securely updating privacy profile settings of a mobile terminal (106) in a communications network for subsequent requests to position the mobile terminal in a communications network. The method includes receiving (705, 1600) a message to update the privacy profile settings of the mobile terminal for subsequent requests to position the mobile terminal, wherein the mobile terminal includes a public key and the network node includes a private key. The method further includes, responsive to receiving the message, calculating (707, 1602) a digital signature for the private key. The method further includes sending (709, 1604) the digital signature toward the mobile terminal for verification. The method further includes completing (717, 1606) the update when the digital signature is verified by the mobile terminal using the public key of the mobile terminal.

Embodiment 49. The method of Embodiment 48, further including sending (709, 1608) present privacy settings of the mobile terminal with the digital signature towards the mobile terminal for verification.

Embodiment 50. The method of any of Embodiments 48 to 49, further including sending (709, 1610) a hash value with the digital signature towards the mobile terminal for the mobile terminal to verify.

Embodiment 51. A first network node (313) configured to operate to securely update privacy profile settings of a mobile terminal (106) in a communications network for subsequent requests to position the mobile terminal in the communications network. The first network node includes a processor (1904); and memory (1906) coupled with the processor. The memory includes instructions that when executed by the processing circuitry causes the first network node to perform operations according to any of Embodiments 48 to 50.

Embodiment 52. A computer program including program code to be executed by a processor (1904) of a first network node (313) configured to operate to securely update privacy profile settings of a mobile terminal (106) in a communications network for subsequent requests to position the mobile terminal in the communications network, whereby execution of the program code causes the first network node (313) to perform operations according to any of Embodiments 48 to 50.

Embodiment 53. A method of operating a mobile terminal (106) for securely updating privacy profile settings of the mobile terminal with an application network node (315) for subsequent requests to position the mobile terminal in a communications network. The method includes authenticating (817, 1700) the application network node during bootstrapping communications based on exchanging secure keys with the application network node. The method further includes securely (819, 1702) updating the privacy profile settings of the mobile terminal with the application network node based on parameter provisioning.

Embodiment 54. A mobile terminal (106) configured to operate to securely update privacy profile settings of the mobile terminal with an application network node (315) for subsequent requests to position the mobile terminal in a communications network. The mobile terminal includes a processor (1810); and memory (1820) coupled with the processor. The memory includes instructions that when executed by the processing circuitry causes the mobile terminal to perform operations according to Embodiment 53.

Embodiment 55. A computer program including program code to be executed by a processor (1810) of a mobile terminal (106) configured to securely update privacy profile settings of the mobile terminal to an application network node (315) for subsequent requests to position the mobile terminal in a communications network, whereby execution of the program code causes the mobile terminal (106) to perform operations according to Embodiment 53.

Embodiment 56. A method of operating an application network node (315) for securely updating privacy profile settings of a mobile terminal (106) with the application network node for subsequent requests to position the mobile terminal in a communications network. The method includes authenticating (817, 1704) the mobile terminal during bootstrapping communications based on exchanging secure keys with the mobile terminal. The method further includes securely (819, 1706) updating the privacy profile settings of the mobile terminal based on parameter provisioning.

Embodiment 57. The method of Embodiment 56, wherein the operation for securely updating the privacy profile settings includes sending (905, 1708) a request toward a network node to update the privacy profile settings of the mobile terminal. The method further includes receiving (915, 1710) a response from the network node with the updated privacy profile settings of the mobile terminal.

Embodiment 58. The method of any of Embodiments 56 to 57, wherein the network node is a network exposure network node (309).

Embodiment 59. The method of any of Embodiments 56 to 58, wherein the network node is a unified data repository node (311).

Embodiment 60. An application network node (315) configured to operate to securely update privacy profile settings of a mobile terminal (106) with the application network node for subsequent requests to position the mobile terminal in a communications network. The application network node includes a processor (1904); and memory (1906) coupled with the processor. The memory includes instructions that when executed by the processing circuitry causes the application network node to perform operations according to any of Embodiments 56 to 59.

Embodiment 61. A computer program comprising program code to be executed by a processor (1904) of an application network node (315) configured to operate to securely update privacy profile settings of a mobile terminal (106) with the application network node for subsequent requests to position the mobile terminal in a communications network, whereby execution of the program code causes the application network node (315) to perform operations according to any of Embodiments 56 to 59.

Further definitions and embodiments are discussed below:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 20:
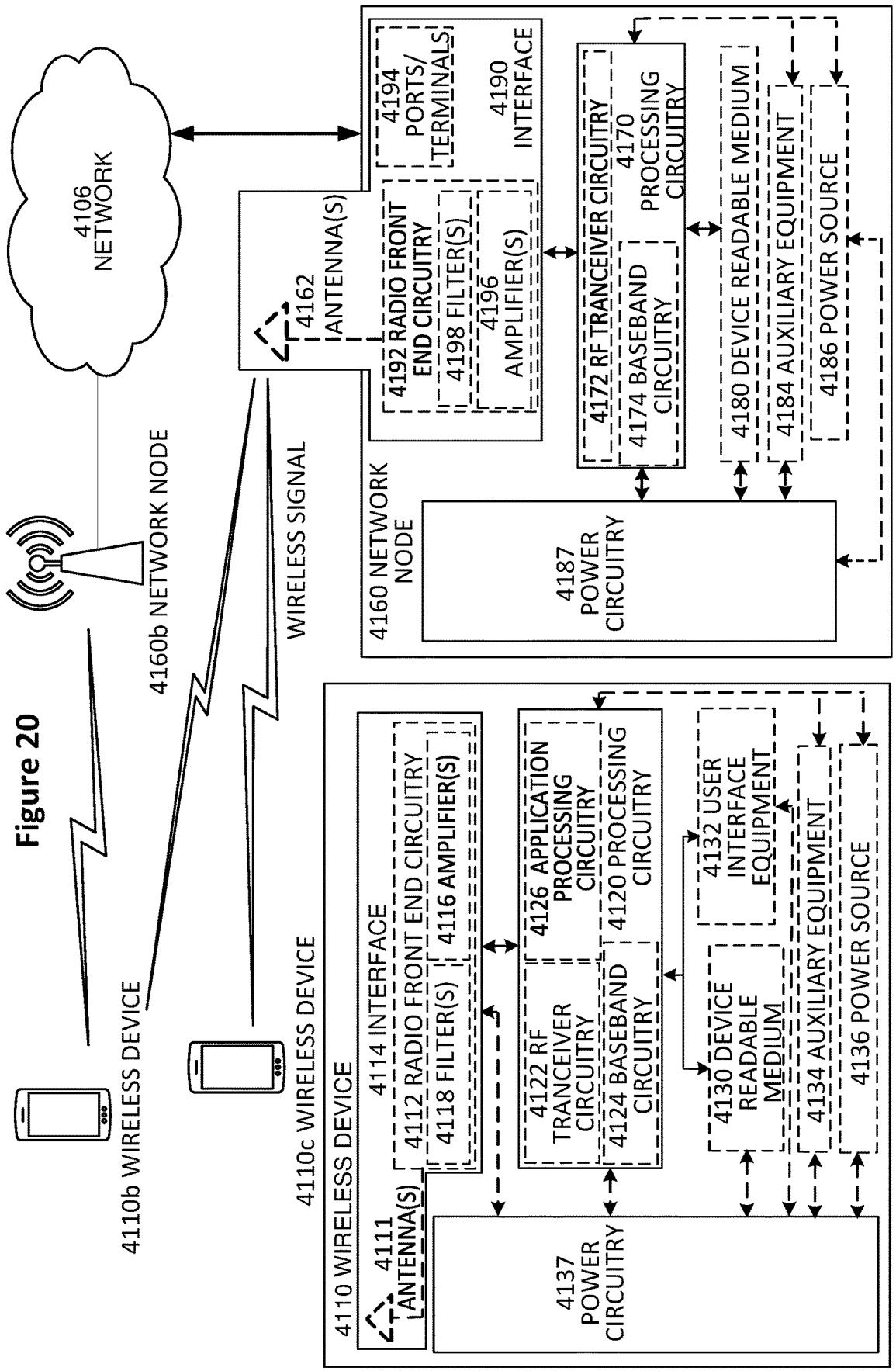
FIG. 20 is a block diagram of a wireless network in accordance with some embodiments of the present disclosure.

FIG. 20: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 20 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE) and other types of a mobile terminal. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE or other terminal implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 21:
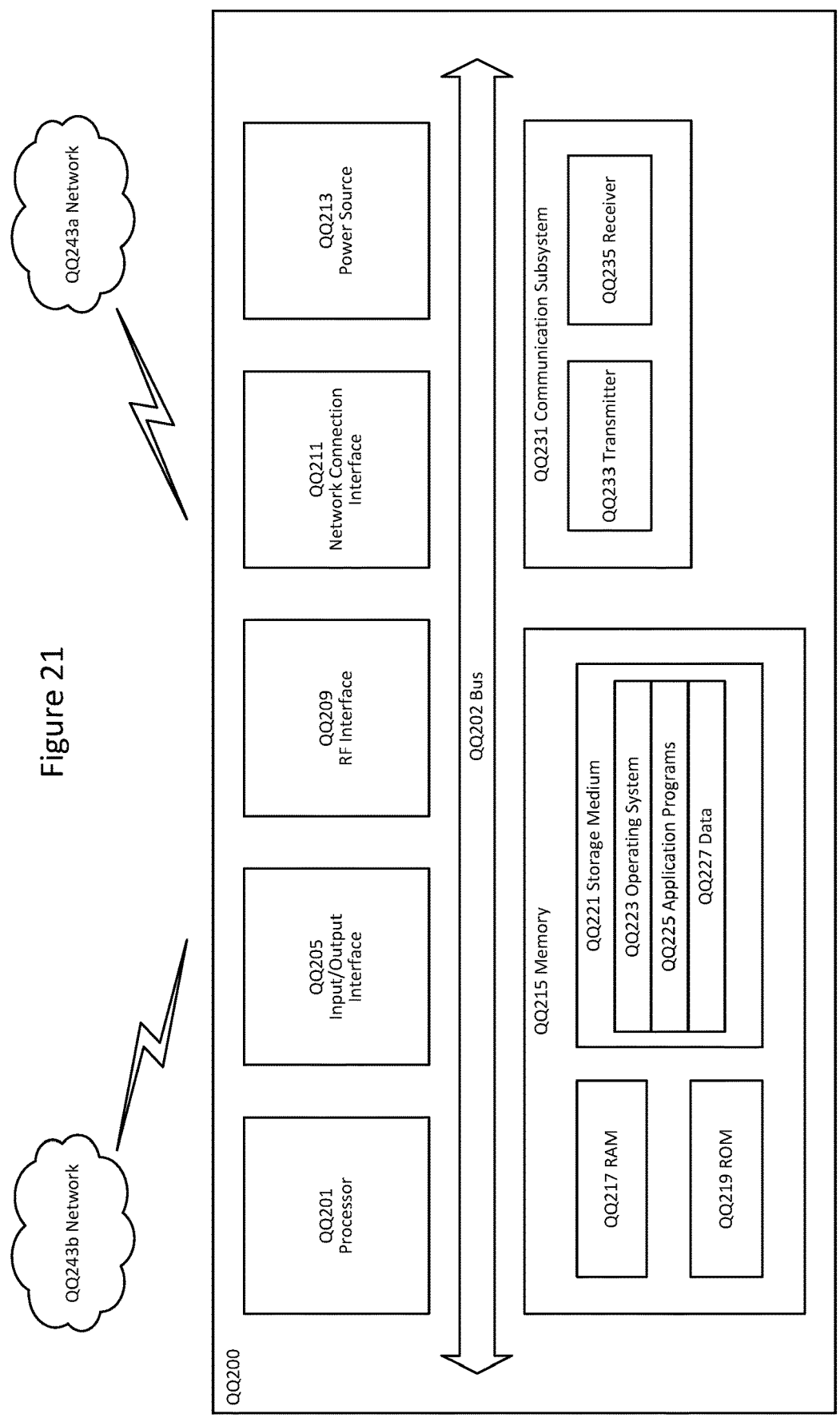
FIG. 21 is a block diagram of a user equipment or other terminal in accordance with some embodiments of the present disclosure.

FIG. 21: User Equipment in accordance with some embodiments

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 21, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 21, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 22:
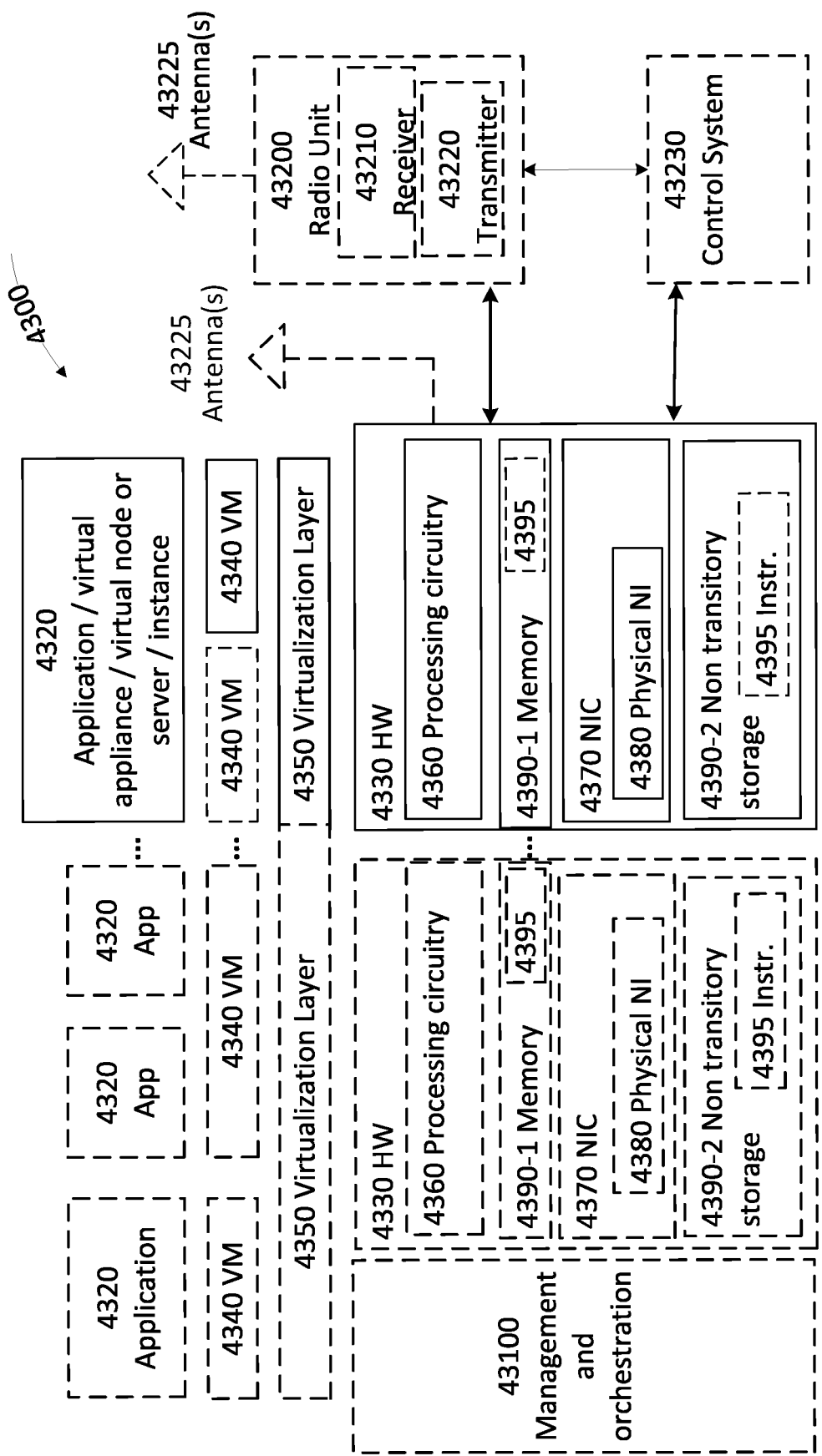
FIG. 22 is a block diagram of a virtualization environment in accordance with some embodiments of the present disclosure.

FIG. 22: Virtualization environment in accordance with some embodiments

FIG. 22 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 22, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 22.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 23:
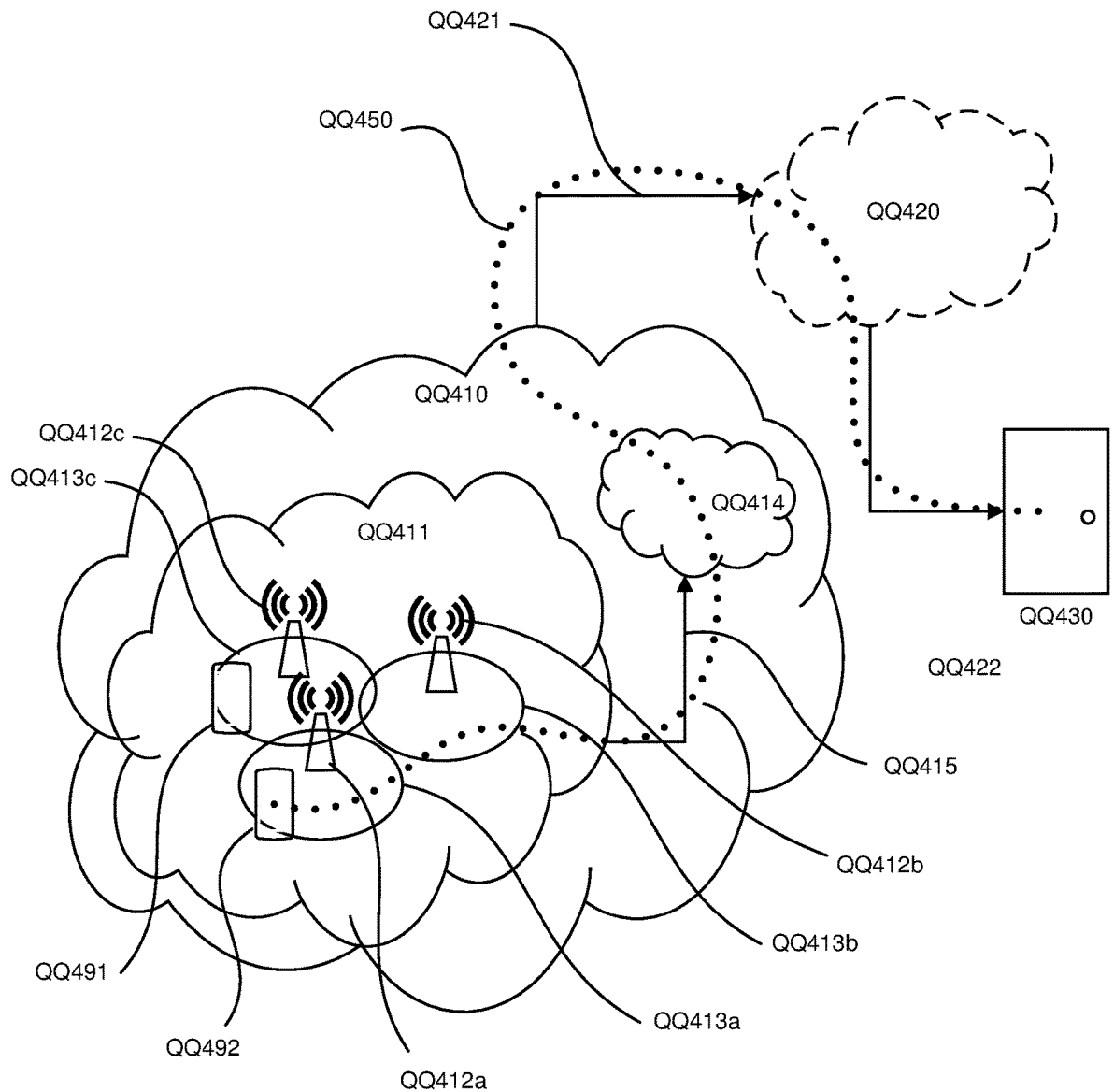
FIG. 23 is a block diagram of a telecommunication network connected via an intermediate network to a host computer in accordance with some embodiments of the present disclosure.

FIG. 23: Telecommunication network connected via an intermediate network to a host computer in accordance with some embodiments.

With reference to FIG. 23, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 23 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 24:
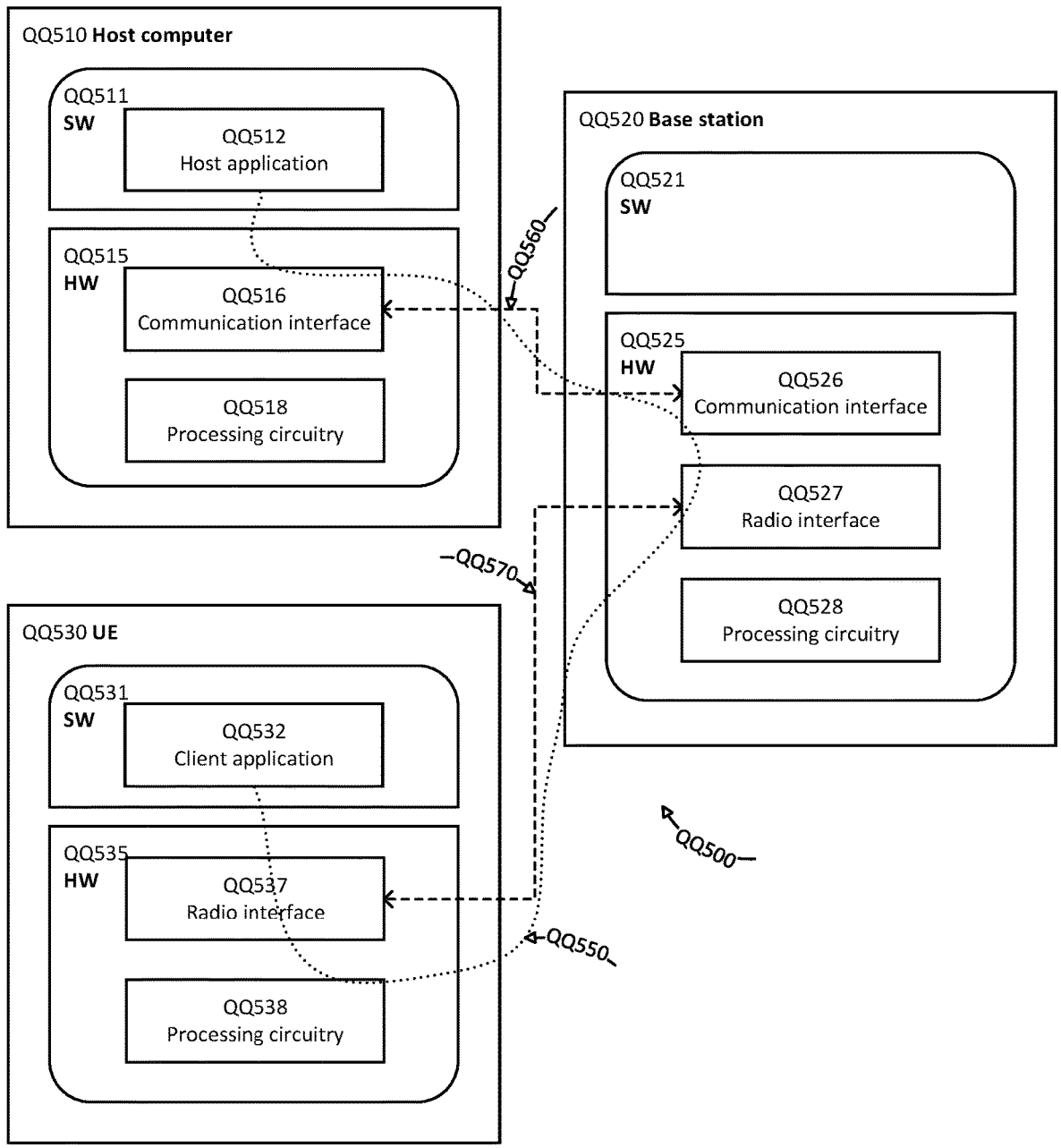
FIG. 24 is a block diagram of a host computer communicating via a base station with a user equipment user equipment or other terminal over a partially wireless connection in accordance with some embodiments of the present disclosure.

FIG. 24: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 24. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 24) served by base station QQ520. Communication interface QQ526 may be configured to facilitate connection QQ560 to host computer QQ510. Connection QQ560 may be direct or it may pass through a core network (not shown in FIG. 24) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 24 may be similar or identical to host computer QQ430, one of base stations QQ412a, QQ412b, QQ412c and one of UEs QQ491, QQ492 of FIG. 23, respectively. This is to say, the inner workings of these entities may be as shown in FIG. 24 and independently, the surrounding network topology may be that of FIG. 23.

In FIG. 24, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 25:
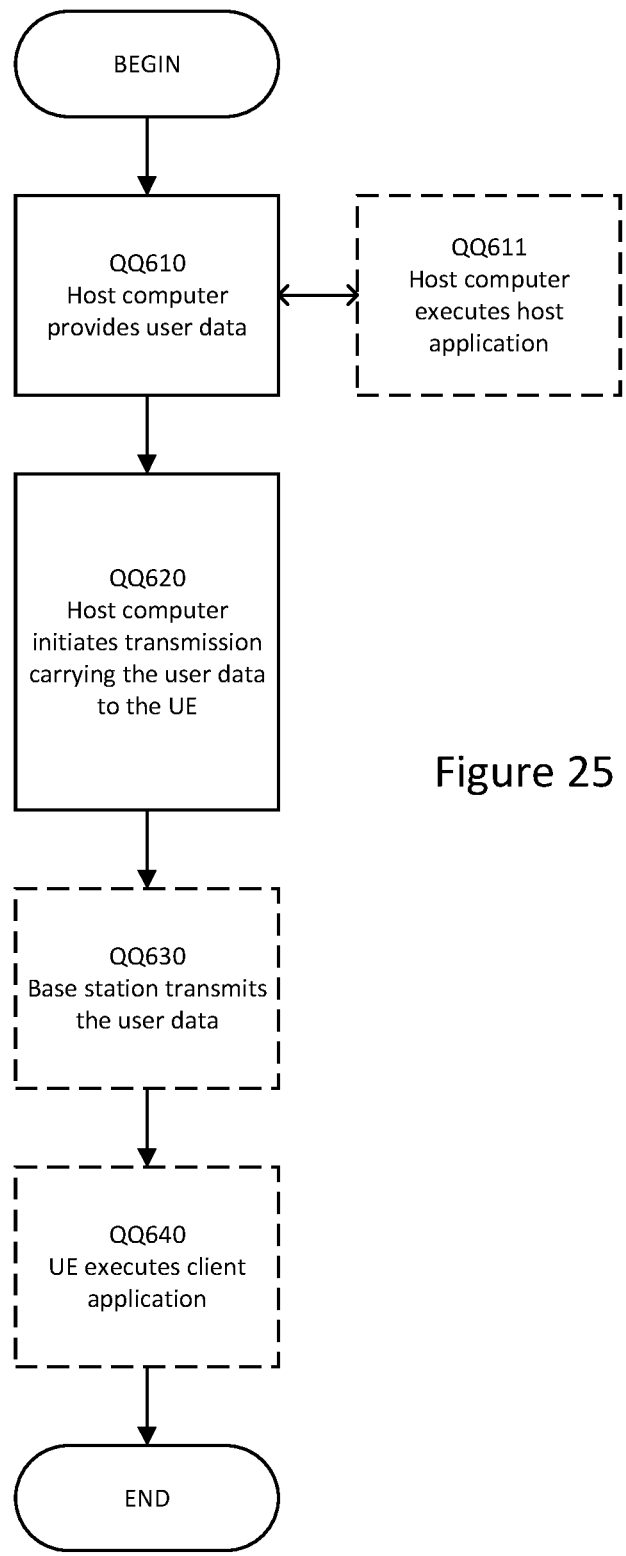
FIG. 25 is a block diagram of methods implemented in a communication system including a host computer, a base station and a user equipment user equipment or other terminal in accordance with some embodiments of the present disclosure.

FIG. 25: Methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 26:
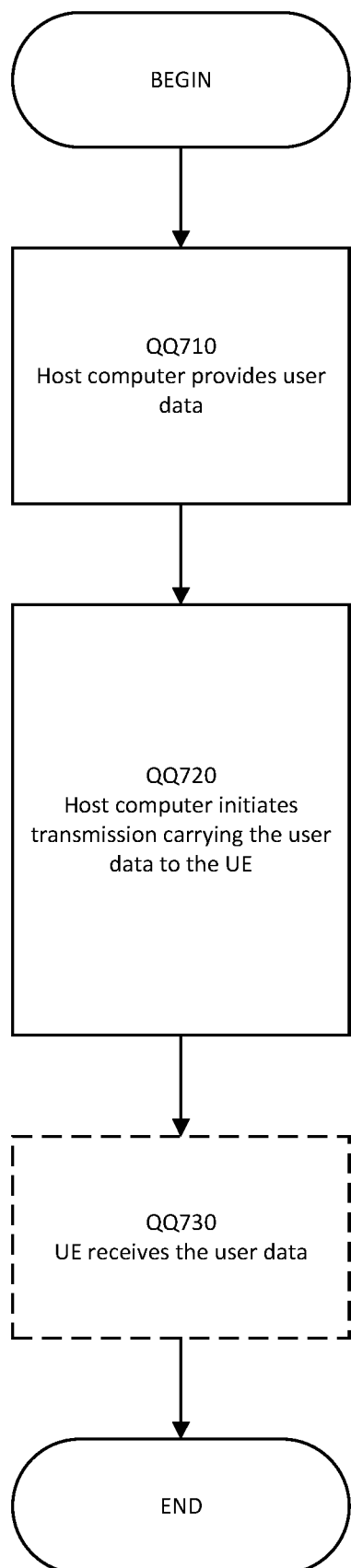
FIG. 26 is a block diagram of methods implemented in a communication system including a host computer, a base station and a user equipment user equipment or other terminal in accordance with some embodiments of the present disclosure.

FIG. 26: Methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 27:
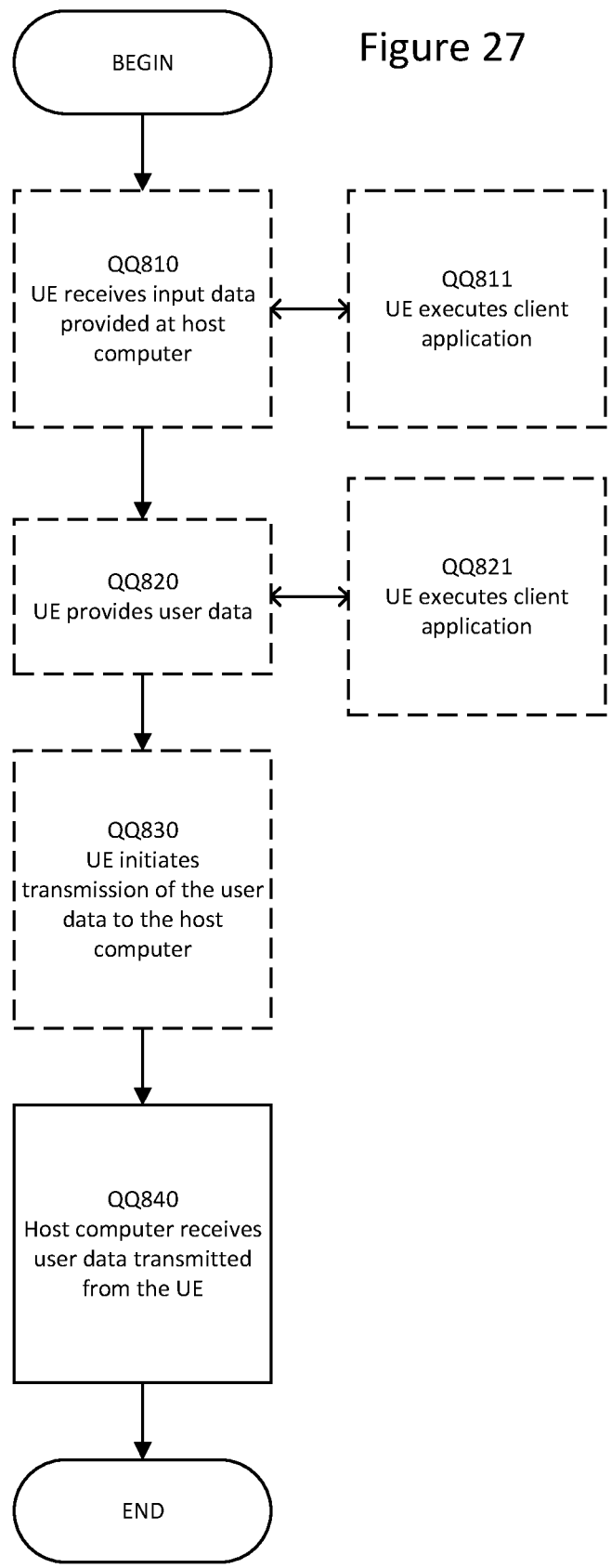
FIG. 27 is a block diagram of methods implemented in a communication system including a host computer, a base station and a user equipment user equipment or other terminal in accordance with some embodiments of the present disclosure.

FIG. 27: Methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 28:
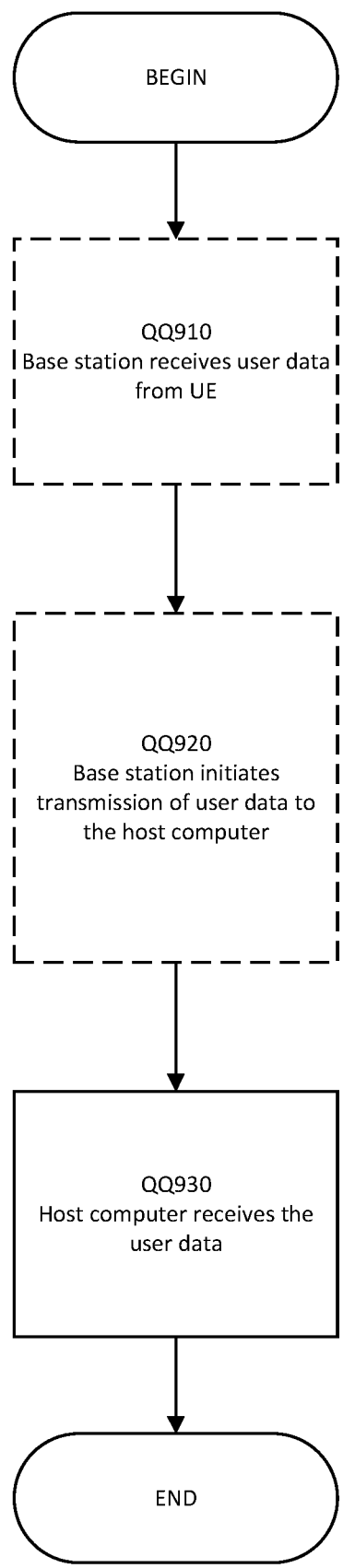
FIG. 28 is a block diagram of methods implemented in a communication system including a host computer, a base station and a user equipment user equipment or other terminal in accordance with some embodiments of the present disclosure.

FIG. 28: Methods implemented in a communication system including a host computer, a base station and a user equipment in accordance with some embodiments.

FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a mobile terminal for verifying at least one privacy profile setting for positioning of the mobile terminal to a location network node in a communications network, comprising:
    receiving a request from the location network node for the mobile terminal to provide a position of the mobile terminal;
    checking the at least one privacy profile setting of the mobile terminal for permission to provide position information of the mobile terminal; and
    determining whether to send the positioning information of the mobile terminal to the location network node based on the checking the at least one privacy profile setting,
    wherein when the checking denies permission to provide the positioning information, the determining comprises ignoring the denial of permission and sending the positioning information of the mobile terminal to the location network node.

2. The method of claim 1, wherein when the checking grants permission to provide the positioning information, the determining comprises sending the positioning information of the mobile terminal to the location network node.

3. The method of claim 1, wherein the checking comprises determining permission based on whether the mobile terminal is allowed or disallowed at the time of the request to provide the positioning information of the mobile terminal.

4. The method of claim 1, wherein the checking comprises:
    determining permission based on generating a notification to a user of the mobile terminal for the user to respond to indicate whether the mobile terminal is allowed or disallowed to provide the positioning information of the mobile terminal; and
    receiving a response to the notification from the user indicating whether the mobile terminal is allowed or disallowed to provide the positioning information of the mobile terminal.

5. The method of claim 1, wherein the checking comprises determining permission based on whether at least one condition is met, wherein the at least one condition comprises allowing or disallowing providing the position information of the mobile terminal using a specified positioning measurement.

6. The method of claim 5, wherein the specified positioning measurement comprises measuring signals received from a at least one of: a WiFi access point and a Bluetooth access point.

7. The method of claim 1, wherein the positioning information comprises at least one of: location measurements and a location estimate.

8. A mobile terminal configured to operate to verify at least one privacy profile setting for positioning of the mobile terminal to a location network node in a communications network, comprising:
    a processor; and
    memory coupled with the processor, wherein the memory includes instructions that when executed by the processing circuitry causes the mobile terminal to perform operations, the operations comprising:
    receive a request from the location network node for the mobile terminal to provide a position of the mobile terminal;
    check the at least one privacy profile setting of the mobile terminal for permission to provide position information of the mobile terminal; and
    determine whether to send the positioning information of the mobile terminal to the location network node based on the checking the at least one privacy profile setting,
    wherein when the check denies permission to provide the positioning information, the determine comprises ignore the denial of permission and send the positioning information of the mobile terminal to the location network node.

9. The mobile terminal of claim 8, wherein when the check grants permission to provide the positioning information, the determine comprises send the positioning information of the mobile terminal to the location network node.

10. The mobile terminal of claim 8, wherein the check comprises determine permission based on whether the mobile terminal is allowed or disallowed at the time of the request to provide the positioning information of the mobile terminal.

11. The mobile terminal of claim 8, wherein the check comprises:
    determine permission based on generation of a notification to a user of the mobile terminal for the user to respond to indicate whether the mobile terminal is allowed or disallowed to provide the positioning information of the mobile terminal; and
    receive a response to the notification from the user indicating whether the mobile terminal is allowed or disallowed to provide the positioning information of the mobile terminal.

12. A method performed by a mobile terminal for verifying at least one privacy profile setting for positioning of the mobile terminal to a location network node in a communications network, comprising:
    receiving a request from the location network node for the mobile terminal to provide a position of the mobile terminal;
    checking the at least one privacy profile setting of the mobile terminal for permission to provide position information of the mobile terminal, wherein the checking denies permission to provide the positioning information;

determining whether to send the positioning information of the mobile terminal to the location network node based on the checking the at least one privacy profile setting; and recording the denial of permission by at least one of: updating the at least one privacy profile setting with the denial of permission and recording the denial of permission in a memory of the mobile terminal.

13. The method of claim 12, wherein the determining comprises not sending the positioning information to the location network node.

14. The method of claim 13, further comprising:
generating a notification to the user of the denial of permission.

15. The method of claim 13, further comprising:
sending a message to a gateway mobile location network node comprising the denial of permission.

* * * * *